United States Patent [19]

Daggett et al.

[11] Patent Number: 4,763,055

[45] Date of Patent: Aug. 9, 1988

[54] DIGITAL ROBOT CONTROL HAVING HIGH PERFORMANCE SERVO CONTROL SYSTEM

[75] Inventors: Kenneth E. Daggett, Murrysville, Pa.; Eimei M. Onaga, Brookfield Center; Richard J. Casler, Jr., Newtown, both of Conn.

[73] Assignee: Westinghouse Electric Corp., Pittsburgh, Pa.

[21] Appl. No.: 932,976

[22] Filed: Nov. 20, 1986

[51] Int. Cl.[4] .......................... B25J 1/02; G06F 15/46
[52] U.S. Cl. ..................................... 318/368; 318/565; 318/567; 364/513; 364/478; 901/25
[58] Field of Search ............... 318/568, 568 C, 568 D, 318/568 E, 568 G, 568 M, 566, 567, 569, 573, 574, 497, 598, 560, 565, 570, 576, 561, 562, 577; 901/2–24, 25, 27, 29; 364/478, 513

[56] References Cited

U.S. PATENT DOCUMENTS

| | | | |
|---|---|---|---|
| 4,068,156 | 1/1978 | Johnson et al. | 364/478 |
| 4,308,584 | 12/1981 | Arria | 364/513 |
| 4,396,987 | 8/1983 | Inaba et al. | 364/513 |
| 4,467,436 | 8/1984 | Chance et al. | 364/513 |
| 4,543,639 | 9/1985 | Inaba et al. | 364/513 |
| 4,547,858 | 10/1985 | Horak | 364/513 |
| 4,549,276 | 10/1985 | Inaba et al. | 364/513 |
| 4,598,380 | 7/1986 | Holmes et al. | 364/513 |
| 4,623,971 | 11/1986 | Ailman et al. | 364/513 |

Primary Examiner—William M. Shoop, Jr.
Assistant Examiner—Paul Ip
Attorney, Agent, or Firm—J. L. Brzuszek

[57] ABSTRACT

A digital robot control is provided with cascaded position/velocity and torque control loops with microprocessor servo controllers in each. The servo controller includes two microprocessors that operate as a servo engine in providing motion control for six robot axes. One microprocessor is structured to perform data processing and coordination tasks. The other one performs calculation tasks and operates as a slave processor to the first.

19 Claims, 30 Drawing Sheets

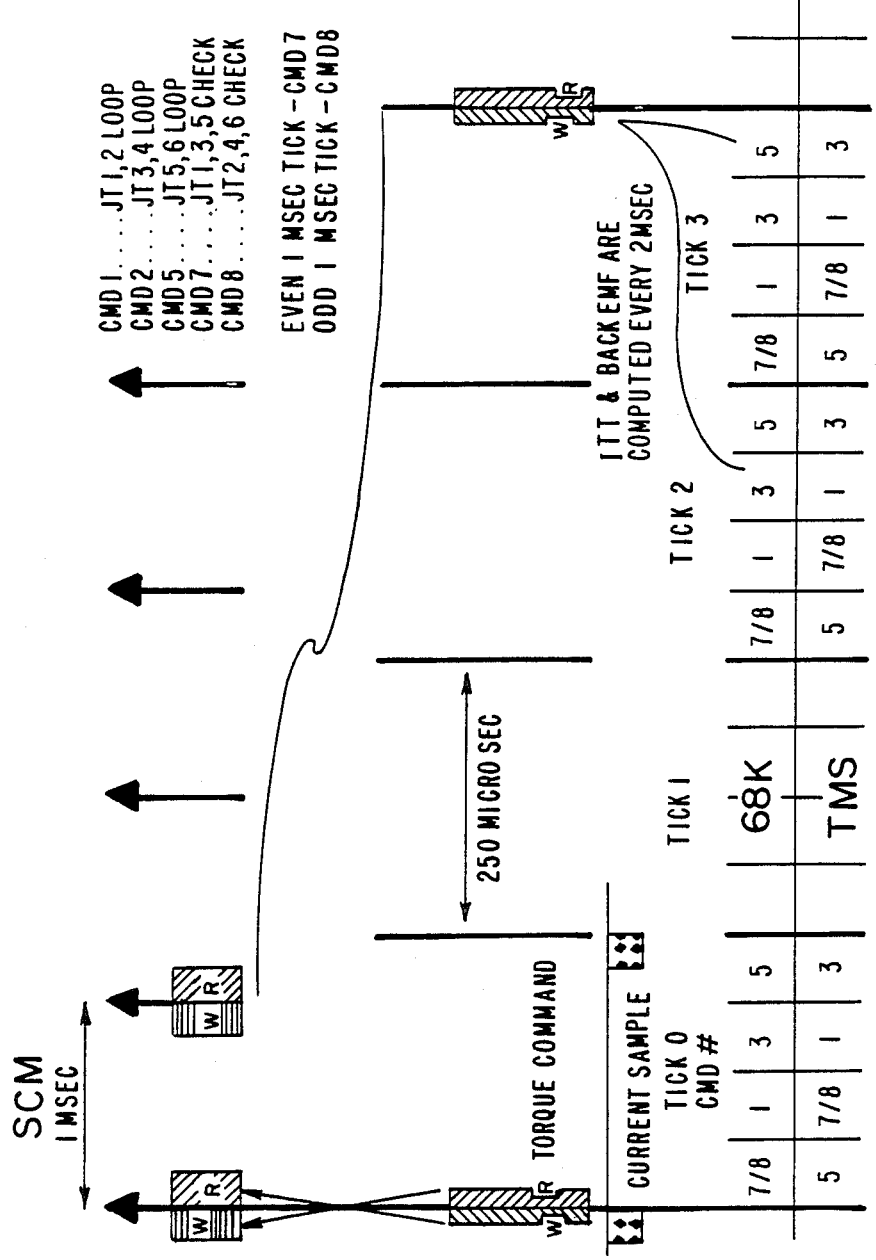

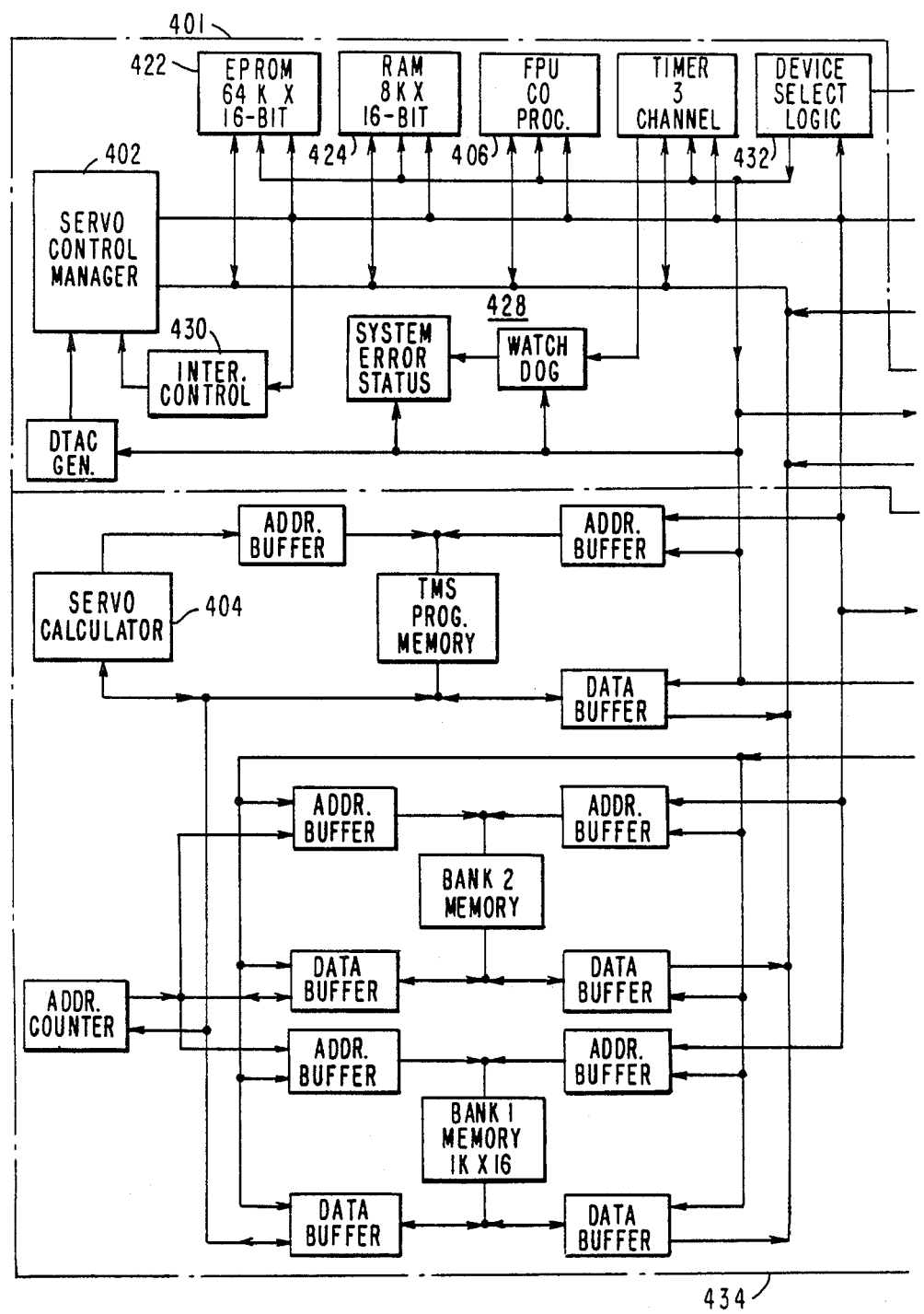
FIG.IOA-I

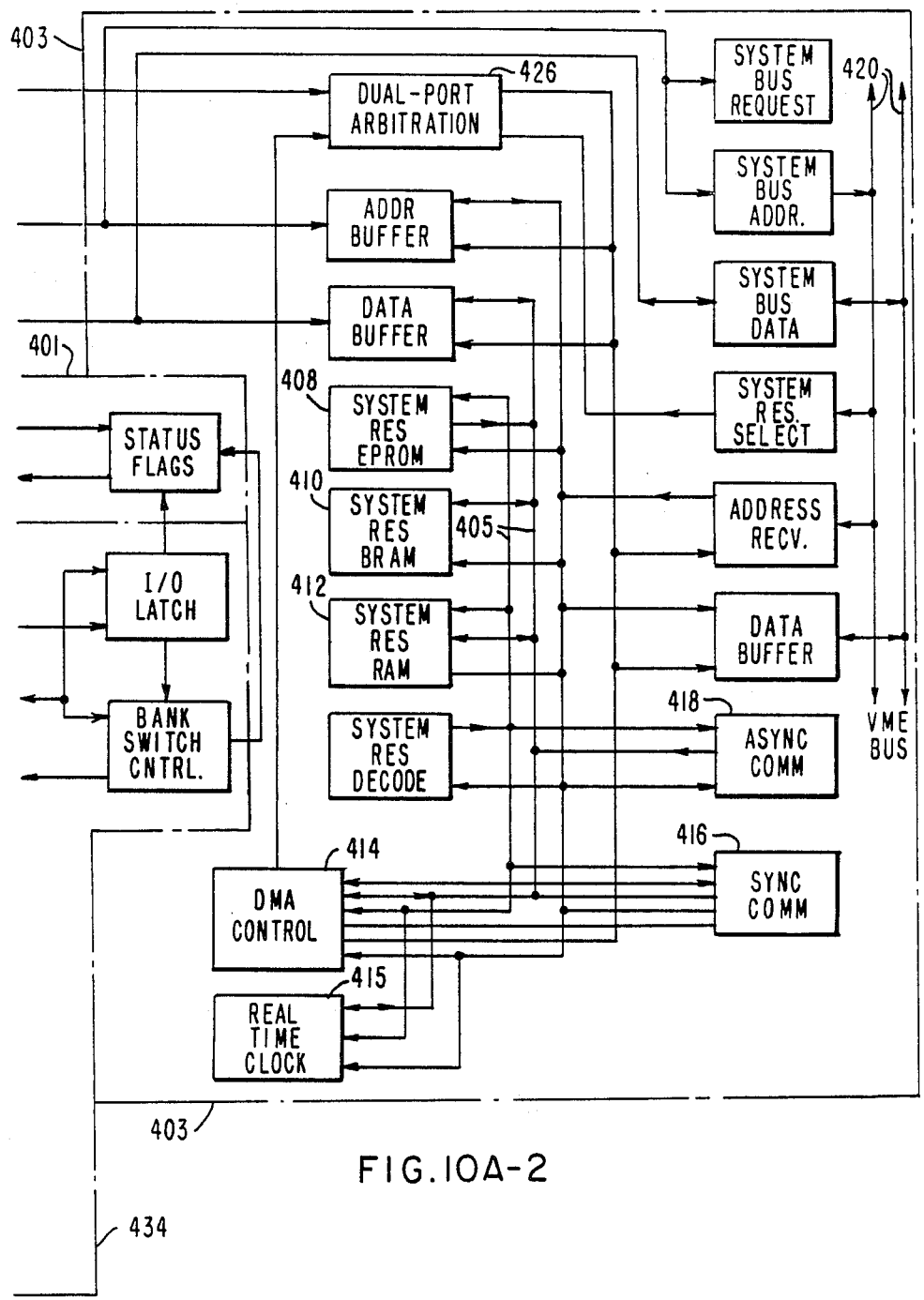
FIG.IOA-2

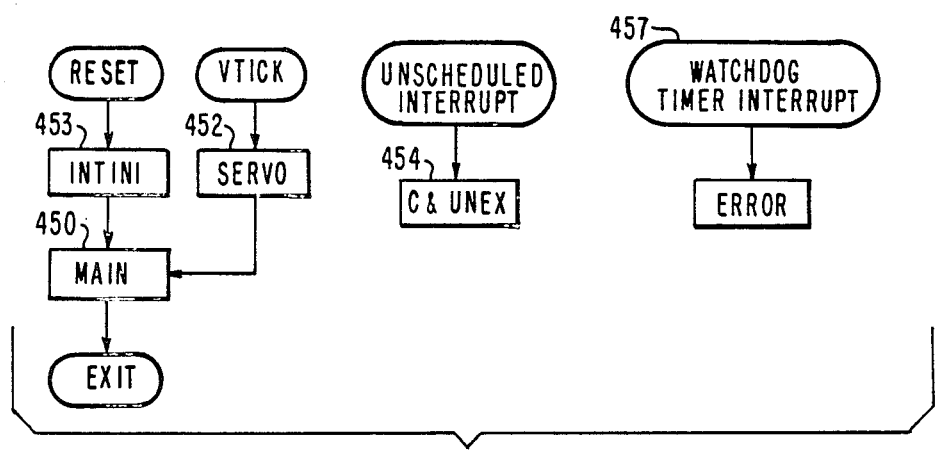
FIG.11B
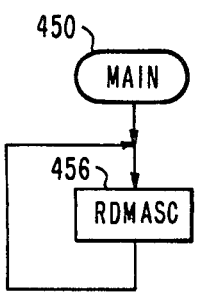
FIG.11D
FIG.11C

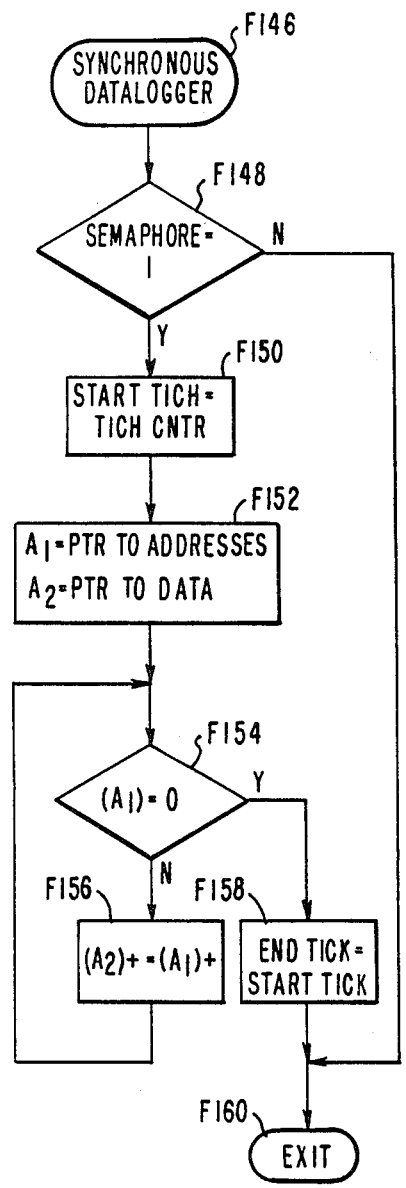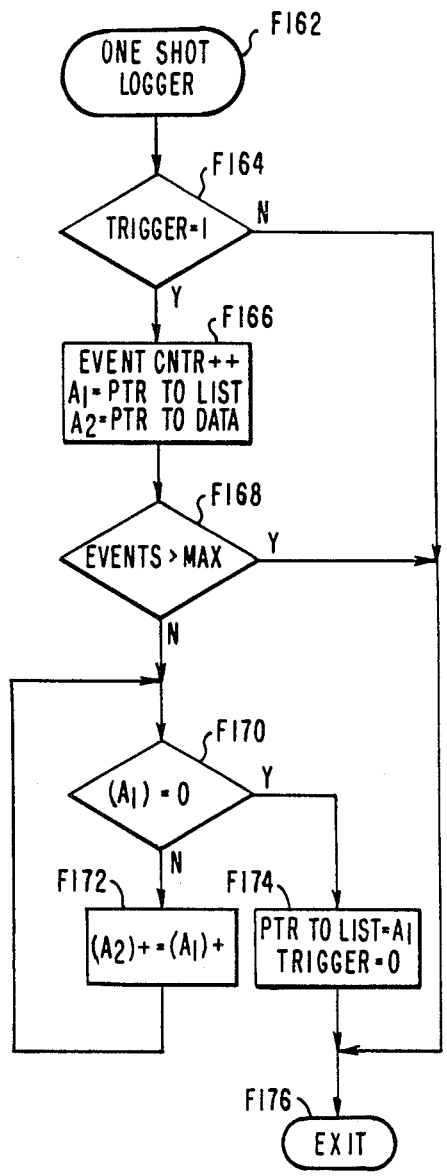
FIG.11G                    FIG.11H

DIGITAL ROBOT CONTROL HAVING HIGH PERFORMANCE SERVO CONTROL SYSTEM

CROSS REFERENCE TO RELATED APPLICATIONS

The following concurrently filed patent applications are related to the disclosure of the present application, assigned to the present assignee and are hereby incorporated by reference:

U.S. Ser. No. 932,975 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 entitled DIGITAL ROBOT CONTROL HAVING AN IMPROVED PULSE WIDTH MODULATOR and filed by Kenneth E. Daggett.

U.S. Ser. No. 932,992 entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Ser. No. 932,974 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Ser. No. 932,989 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 entitled MODULAR ROBOT CONTROL SYSTEM and filed by Kenneth E. Daggett, Barett Booth, Vincent P. Jalbert, Eimei Onaga and Richard J. Casler.

U.S. Ser. No. 932,977 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Ser. No. 932,986 entitled MULTIAXIS ROBOT HAVING IMPROVED MOTION CONTROL THROUGH VARIABLE ACCELERATION/DECELERATION PROFILING and filed by Rajan Penkar.

U.S. Ser. No. 932,988 entitled MULTIAXIS ROBOT CONTROL HAVING CAPABILITY FOR EXECUTING TIMED MOVES and filed by Rajan Penkar.

U.S. Ser. No. 932,985 entitled MULTIAXIS ROBOT CONTROL HAVING IMPROVED CONTINUOUS PATH OPERATION and filed by Rajan Penkar.

U.S. Ser. No. 922,840 entitled MULTIAXIS ROBOT CONTROL HAVING FITTED CURVED PATH CONTROL AND FILED BY Rajan Penkar.

U.S. Ser. No. 932,973 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Ser. No. 932,842 entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robot controls and more particularly to electronic robot controls in which microprocessors are employed in the implementation of servo control loops.

A robot control typically has capability for operating six robot axes, and each axis is typically provided with position and velocity control looping. In the case of a completely digital robot control like that set forth in this and the referenced patent applications, current control looping can also be included in the robot control.

In the implementation of a robot control with microprocessor technology, significant processing capability is thus required for servo loop control implementation in both hybrid digital/analog systems and completely digital systems. The required processing capability is based on general control requirements, data handling requirements and mathematical processing requirements.

The total capability requirement generally is not available in commercially available microprocessors. As a result, it has been the practice to employ multiple microprocessors in robot controls, with the microprocessors being assigned position and velocity and related control tasks on a per axis basis. One disadvantage associated with this design approach is that interactions among axes are not readily taken into account. Further, even with multiple microprocessors, there is limited capacity to accommodate more complex control algorithms which can be expected to be developed with continuing development of robot control technology.

Since no single microprocessor provides the features needed to satisfy the processing capability requirements for multi-axis robot control, it has been desirable that a new multi-microprocessor arrangement be devised provide improved microprocessor based robot control and to enable completely digital robot control to be achieved with high performance results, cost effectiveness and manufacturing economy. The present invention is directed generally to a multiprocessor servo control that can be embodied in different multiaxis robot control loops. Reference is made to U.S. Ser. No. 932,977 and U.S. Ser. No. 932,990 which are respectively related to a torque control embodiment and a position/velocity control embodiment. Reference is also made to U.S. Ser. No. 932,992 which is specifically related to an inter-processor communications interface employable in the multiprocessor servo control.

SUMMARY OF THE INVENTION

A robot arm has a plurality of motor driven joints energized by respective power amplifiers. Respective feedback control loop means control the power amplifiers.

Each of the feedback control loop means includes at least digital position and velocity control loops and at least one servo control means is provided for performing control support tasks and calculation tasks in at least one of the control loops for all of the joint motors. The first servo control means includes a first microprocessor for performing calculation tasks including computing output control commands from stored algorithms for the one control loop for each joint motor;

A second microprocessor supervises the operation of the first servo control means and performs servo control support tasks in the control loop for each joint motor including the routing of control command, status and feedback data to and from the first microprocessor.

The first microprocessor has a relatively high computing performance capability and a relatively low data processing interface capability, and the second microprocessor has a relatively high data manipulating processing capability.

Communication interfacing is provided for the first and second microprocessors relative to each other and relative to higher and lower level control circuitry so as to enable the servo control means to operate the one control loop for each joint motor and control the controlled variable for the one control loop.

BRIEF DESCRIPTION OF THE DRAWINGS

FIGS. 6A1 and 6A2 show a schematic diagram of an electronic torque processor (TP) board included in FIG. 4 and embodying in a first invention embodiment the servo control system of FIG. 5;

FIGS. 7A1-7A3 show a still more detailed diagram of the control loop arrangement of FIG. 2;

FIGS. 7B1-7B2 show a diagram of the torque control loop included in the diagram of FIG. 7A;

FIGS. 8A1-8G show schematic flow charts representing programming run in microprocessors employed in the TP board circuitry;

FIG. 9 shows a timing chart for the torque processor board operation;

FIGS. 10A1 and 10A2 show a schematic diagram of an electronic servo control (SCM) board included in FIG. 4 and embodying in a second invention embodiment the servo control system of FIG. 5; and FIGS. 11A-11H show schematic flow charts representing programming run in microprocessors employed in the SCM board circuitry; and FIGS. 12A1-12A2 show diagrams illustrating data flow and timing for the SC, AIF SCM AND TP boards.

DESCRIPTION OF THE PREFERRED EMBODIMENT

Robots—Generally

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading heat treatment, metal deburring, palletizing, brick manufacturing, glass manufacturing, etc. For more complete consideration of robots and their uses, reference is made to a book entitled "Robotics in Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
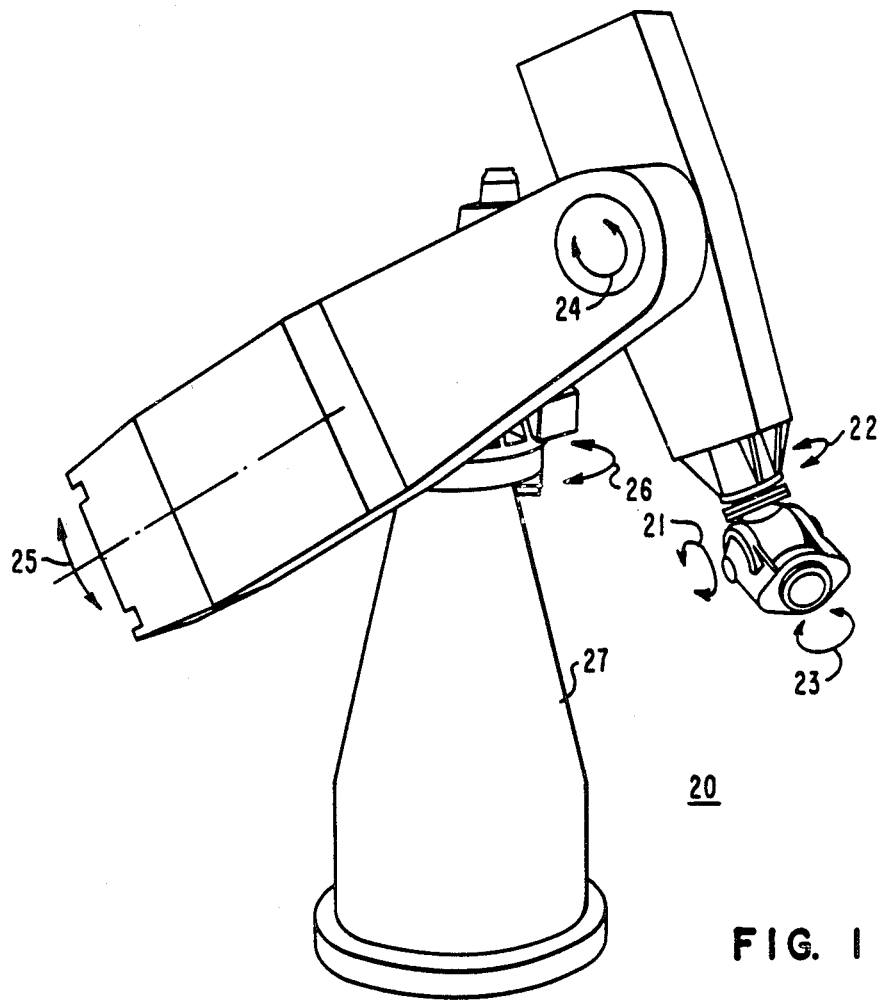
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third arm motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIGS. 2, 3 or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of lies the control 30 in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

Control Loops

Figure 2:
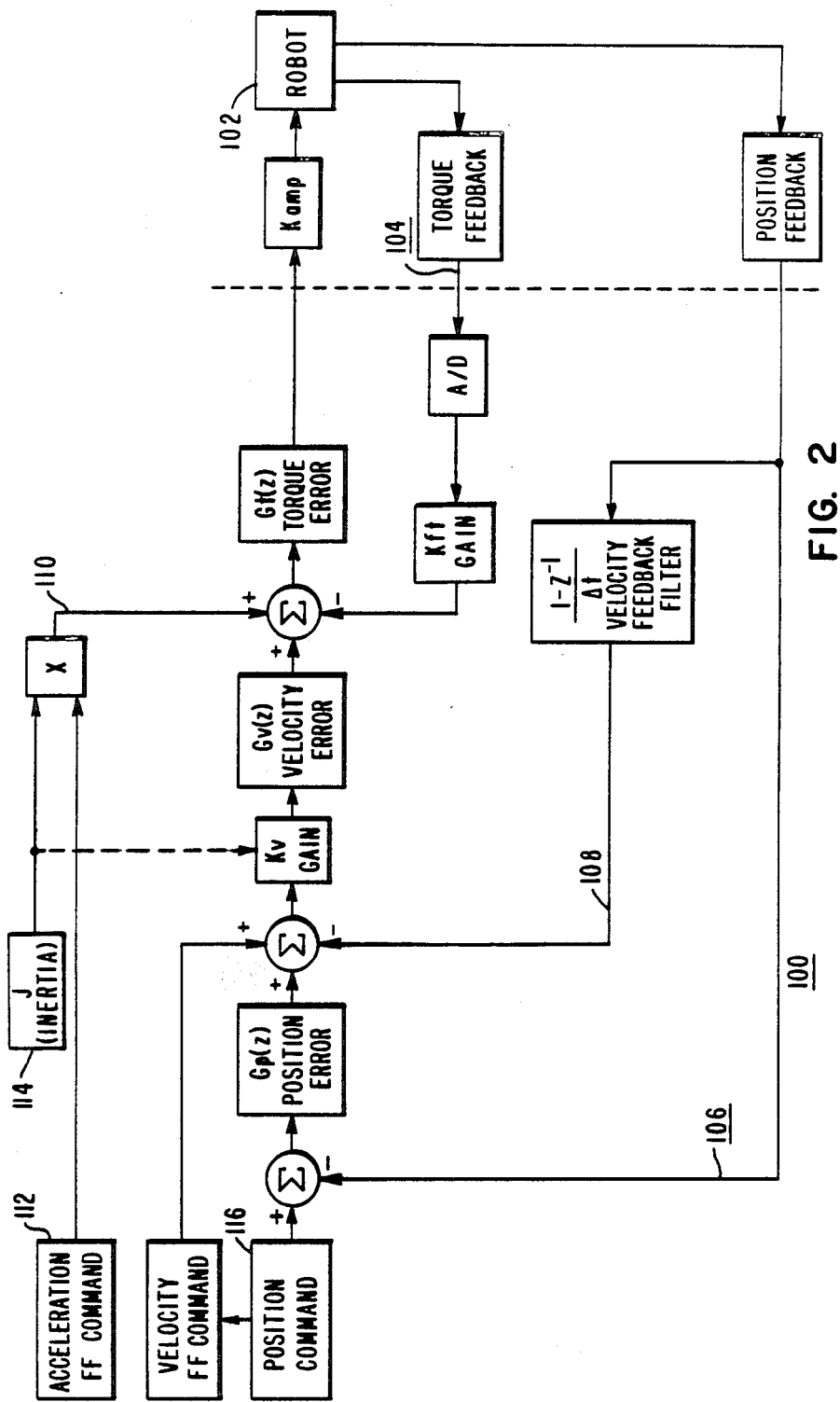
FIG. 2 shows a generalized block diagram of a control loop arrangement employing position, velocity and torque control loops in which the invention may be embodied.

In FIG. 2, there is shown an embodiment of a generalized control loop configuration 100 employable in the robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
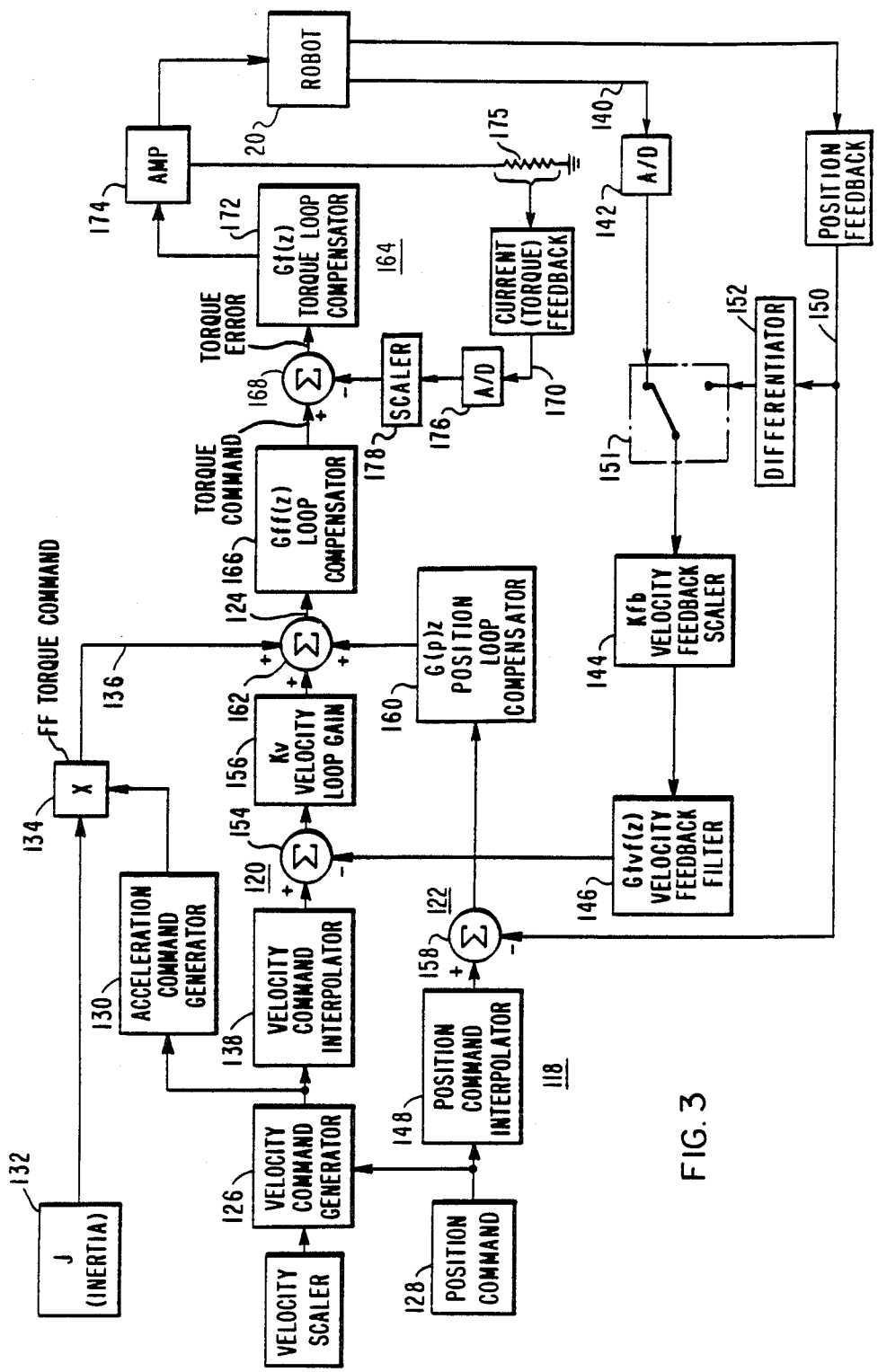
FIG. 3 shows a more detailed block diagram of a control loop arrangement employing position, velocity and torque control loops in which the invention preferably is embodied.

FIG. 3 shows the preferred generalized control loop configuration 118 presently employed in the robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 122 and velocity control loop 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 138 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications Ser. No. 932,841 and Ser. No. 932,853.

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error and pulse width modulator (PWM) commands (motor voltage commands) are applied to a power amplifier 174 which supplies the motor drive current for robot joint operation. Current feedback from resistor 175 is generated every 250 microseconds (see present FIG. 7B-1 and referenced patent application Ser. No. 932,975) and converted to digital signals by box 176 with scaling applied by box 178.

Figures 1, 7A:
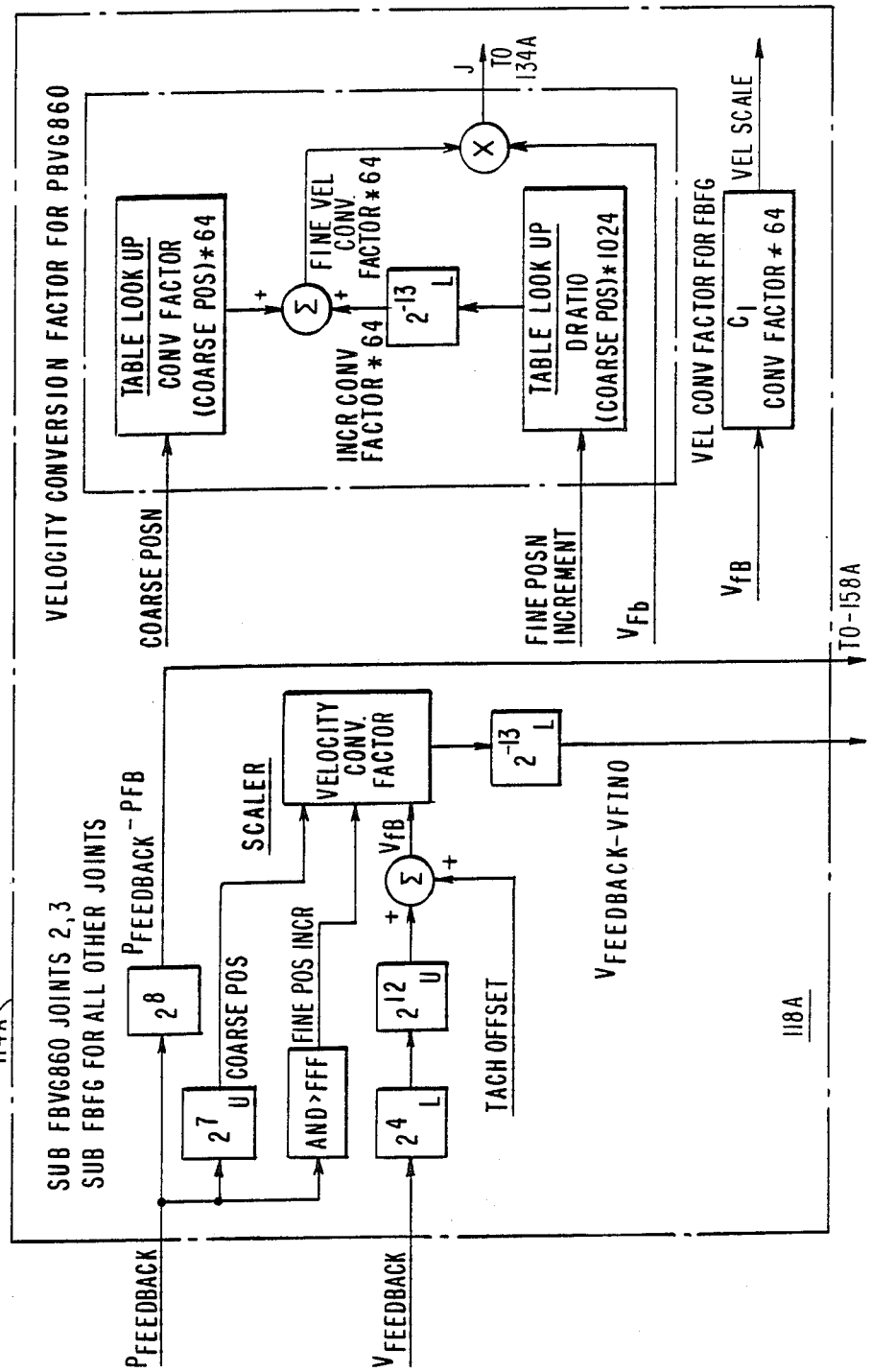
Figures 2, 7A:
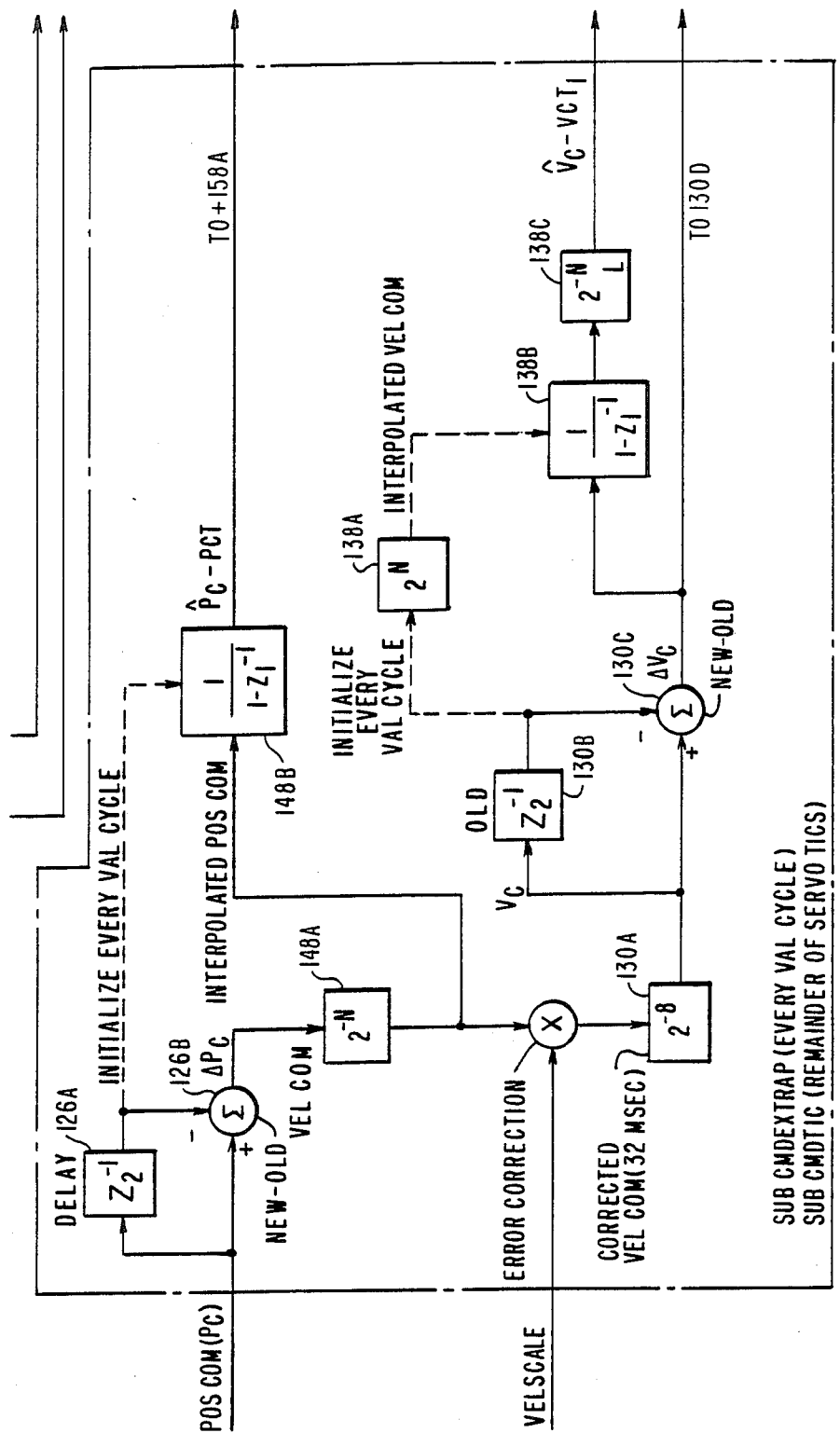
Figures 3, 7A:
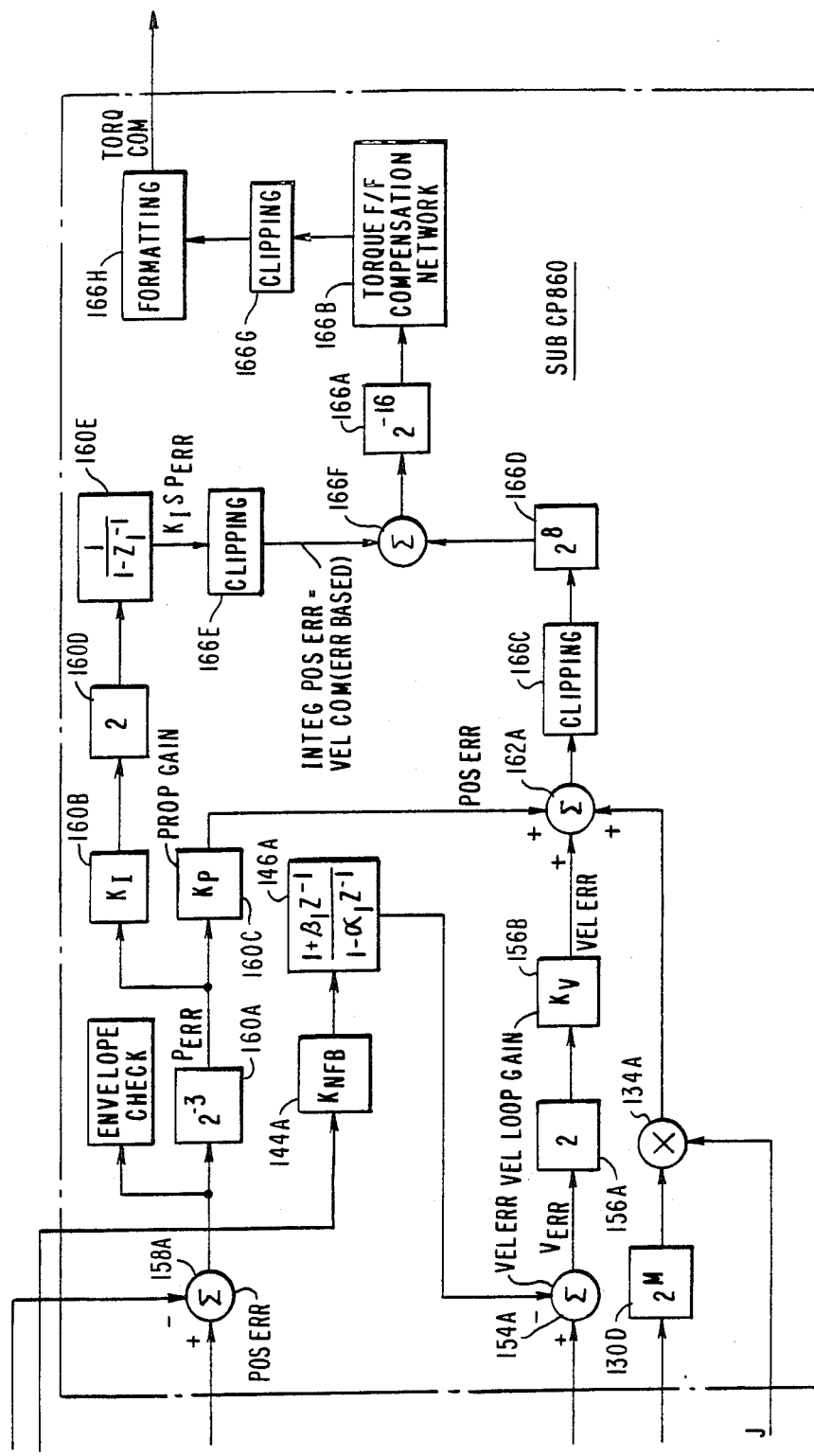

In FIG. 7A1–7A3, there is shown a control loop 118A representing another embodiment of the invention arranged to operate a particular Unimation 860 robot for which special velocity feedback processing is needed. The control loop 118A is structured and operates much like the control loop 118 in FIG. 3, but it is shown with greater block detail. The following table provides correspondence between the control loop 118A and the control loop 118:

| ELEMENT IN LOOP 118 | CORRESPONDING ELEMENTS IN LOOP 118A |
| --- | --- |
| Velocity command generator 126 | 126A; 126B |
| Position command interpolator 148 | 148A; 148B |
| Acceleration command generator 130 | 130A; 130B; 130C; 130D |
| Velocity command | 138A; 138B; 138C |

| ELEMENT IN LOOP 118 | CORRESPONDING ELEMENTS IN LOOP 118A |
|---|---|
| interpolator 138 | |
| Velocity loop gain 156 | 156A; 156B |
| Position loop compensator 160 | 160A through 160E |
| Loop compensator 166 | 166A through 166H |
| Velocity feedback scaler 144 | box 144A |

The velocity feedback scaler is specially structured to provide compensation for nonlinearity in the relationship between actual joint motor velocity and actual joint motor shaft velocity (the sensed velocity parameter) for certain Unimation 860 robots. The system uses a ballscrew with floating pivot point as a drive mechanism. The speed of ballscrew movement is related to motor speed by a nonlinear function. The JT2 and JT3 robots are the units that use this mechanism and a lookup table is provided to linearize the feedback velocity signal supplied to the servo system.

Overview—Electronic Boards

Figure 4:
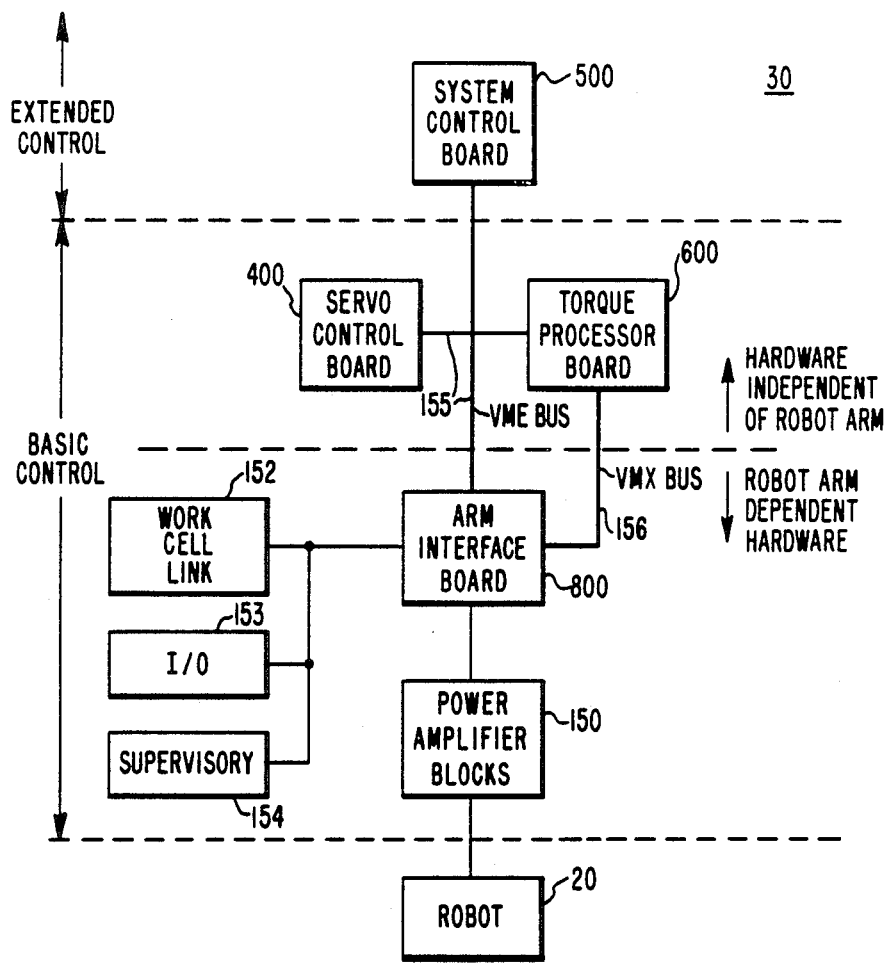
FIG. 4 shows an overview of an arrangement of electronic boards on which circuitry is arranged to implement the robot control system including the servo control of the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

Overview of Multiprocessor Servo Control System and Servo Processing Engine

Figure 5:
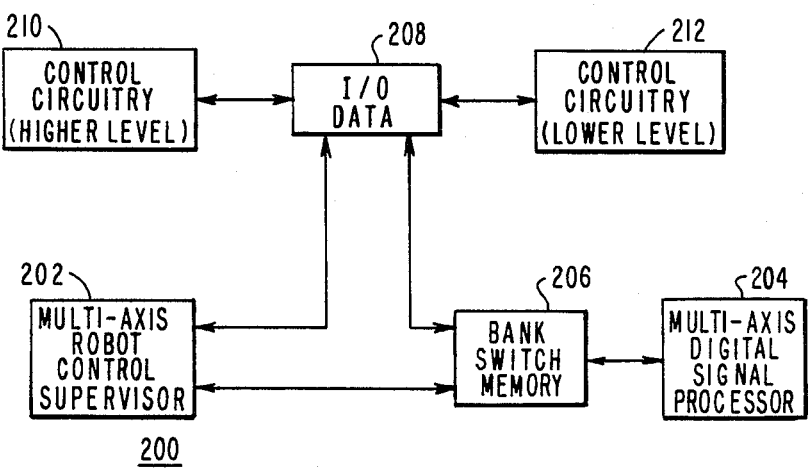
FIG. 5 shows a block diagram of a servo control system arranged to operate in a multi-axis digital robot control in accordance with the invention.

The basic structure of a multiprocessor servo control system 200 in accordance with the invention is illustrated in FIG. 5. Multi-axis robot servo control is generated by the joint operation of two microprocessors; specifically, a multi-axis robot control manager 202 generally performs data handling functions while a multi-axis digital signal processor or calculator 204 generally performs computing functions in a slave capacity relative to the manager processor 202. A bank switched or ping-pong memory 206 interfaces the two microprocessors. Input/output data 208, including incoming commands and outgoing commands, are received from higher level control circuitry 210 or sent to lower level control circuitry 212.

In general, microprocessors based on the conventional Von Neumann computer architecture provide the necessary processing capability for performance of the control support and data handling tasks associated with advanced multi-axis robot controls. However, the mathematical processing capability of the Von Neumann type microprocessor is generally inadequate to provide servo control in a single microprocessor for robot control having six axes.

On the other hand, specialized computer architectures have been developed for microprocessors intended for digital signal processing applications. These microprocessors generally have a high speed, fixed point mathematical processing capability which is more than adequate for the numerical calculations required for implementing advanced servo control algorithms in multi-axis robot controls. However, the signal processors are generally lacking in control task support and data handling capabilities.

Accordingly, in implementing the present invention, the two basic microprocessor types are paired together in a multiprocessor architecture. The teamed microprocessors function as a coordinated unit or a servo processing "engine" and thereby enable a multi-axis robot control to provide significantly improved robot performance with control unit manufacturing economy.

Generally, the processors 202 and 204 are tightly coupled within the multiprocessor architecture, and the signal processor 204 operates as a slave peripheral device to the manager 202. Coordination of the servo engine is provided by software control in the manager processor 202 through the interface 206. Thus, upward and downward data communications to circuitry 210 and 212 are placed under supervisory computer control.

Preferably, two interface paths are provided between the two microprocessors. One interface path enables the manager 202 to specify slave processor execution functions. The other interface path is used for commands, status and data, i.e., to command execution of selected slave functions, to provide data to be used in execution of the function, and to return status and data results produced as a result of execution.

A Motorola 68000 device may be employed for the manager 202 and a Texas Instruments TMS 320 device may be employed for the calculator 204. The Motorola 68000 microprocessor used in the specific torque control embodiment of the multiprocessor servo control is a 16-bit microprocessor operating at 10.0 Mhz system clock frequency.

The TMS 320 processor uses a modified "Harvard" architecture for speed and flexibility. In a strict Harvard architecture, program and data memory lie in two separate spaces, permitting a full overlap of instruction fetch and execution. The modified Harvard architecture in the TMS 320 allows transfers between program and data spaces, thereby increasing the flexibility of the device.

High speed fixed point computational capability is provided by the TMS 320 since it uses internal hardware to implement functions typically implemented by software or microprogrammed firmware in other processors. For example, the TMS 320 contains a hardware multiplier that performs a 16×16 bit multiplication in 200 nanoseconds. Further, a hardware barrel shifter shifts data on its way into the ALU so that data alignment and multiplication can be performed in a single instruction.

Since the TMS 320 is primarily intended for use in stand alone applications, its external interface capability is limited. Thus, the TMS program memory or I/O operations cannot easily be suspended to allow concurrent access by the controlling manager processor 202. Thus, special interfacing circuitry is needed and it is provided in the form of the bank switched memory 206 which meets the special needs of the invention embodiment disclosed herein and can be used in other multiprocessor applications. Reference is made to copending patent application Ser. No. 932,992 for more information on the bank switched memory.

Torque Processor Board Concepts—Torque Control Embodiment of Multiprocessor Servo Control The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate robot joint motor currents to commanded values by generating motor winding voltage commands which are executed using a pulse width modulation scheme on the AIF board.

The TP board 600 interfaces at one level to the SCM board, accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP board 600 employs the paired microprocessor to provide a number of features including the following:

1. Torque loop control for six axes (250 micro sec per 6 axes) for brush and brushless motors;
2. Software adjustable current offset—eliminates potentiometers;
3. Downloadable gains—arm dependent parameters can be downloaded from the SCM board;
4. PWM compensation;
5. Commutation compensation;
6. Current averaging for data logging and other purposes;
7. Current limit check;
8. Velocity monitoring (back emf) for safety check;
9. Energy check (IIT) to test stall condition;
10. Power-up self diagnostics; and
11. Downloadable diagnostics system.

Torque Processor Board

More advanced robot performance is produced by digitally controlling the torque applied at the arm workpoint when the arm is in motion to control the arm workpoint position in accordance with a command trajectory. Axis drive forces are adjusted in accordance with actually experienced workpiece loading to satisfy position and trajectory commands with greater speed accuracy and efficiency. Reference is made to Ser. No. 932,977 for a related invention directed to the control of torque as an end controlled variable.

The torque control is embodied on a generic control circuit board 600 (FIGS. 4 and 6A-1 and 6A-2) called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback signal is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The memory interface 604 between the TP and SCM boards is a dual port shared memory scheme which serves as a slave to the VME bus 606. Other board memories include a ping-pong memory 608, program EPROM, local RAM, and TP calculator memory.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedback, and status data so that it is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency response requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 has an architecture well suited for the tasks described for data management but which has a calculating speed (i.e., over 4 microseconds for a 16×16 bit multiplication) too limited to meet torque control bandwidth requirements. The digital signal processor 610 has an architecture set for Z transform calculations (i.e., a calculating speed of 200 nanoseconds for a 16×16 bit multiplication) but which is otherwise generally unsuitable for the kinds of tasks assigned to the data manager processor 602. These two microprocessors function together as a unit or, in other terms, as a servo engine.

For more detail on the torque board circuitry, reference is made to Ser. No. 932,977 or Ser. No. 932,992.

Torque Control Programming

The torque processor board 600 is operated under the control of programs executed in the on board processors 602 and 610 to implement torque command signals from the higher SCM control level.

The torque processor software generally performs the following tasks which are partitioned as indicated:

Torque Control Manager 602

Communication with SCM
Command handling
Current sampling, conversion and offset adjustment
Commutation switch flag (state reading)
Ping-pong memory management
PWM chip management
Diagnostics
Error reporting Torque Loop Calculator 610

(program cycling based on 250 microsecond interrupt)

Overcurrent check—absolute and average
Torque loop calculations
Current averaging
PWM compensation
Commutation compensation
Back emf check—monitors velocity for safety
Energy check—tests for stall conditions TP Manager More particularly, the torque control manager 602, as its name implies, directs most of the torque processor board operations. The torque loop calculator 610 affects board operations in the sense that calculated outputs enable certain board operations to occur under the direction of the torque control manager 602.

The programming for the torque control manager 602 includes various conventional system housekeeping programs which support the operation of application programs involved in embodying the invention. The application programming is stored in an EPROM memory 614 referred to as the TCM (torque control management) program memory. Operating data is stored in a local RAM memory 616 referred to as a TC (torque control) data base memory.

Figures 1, 8A:
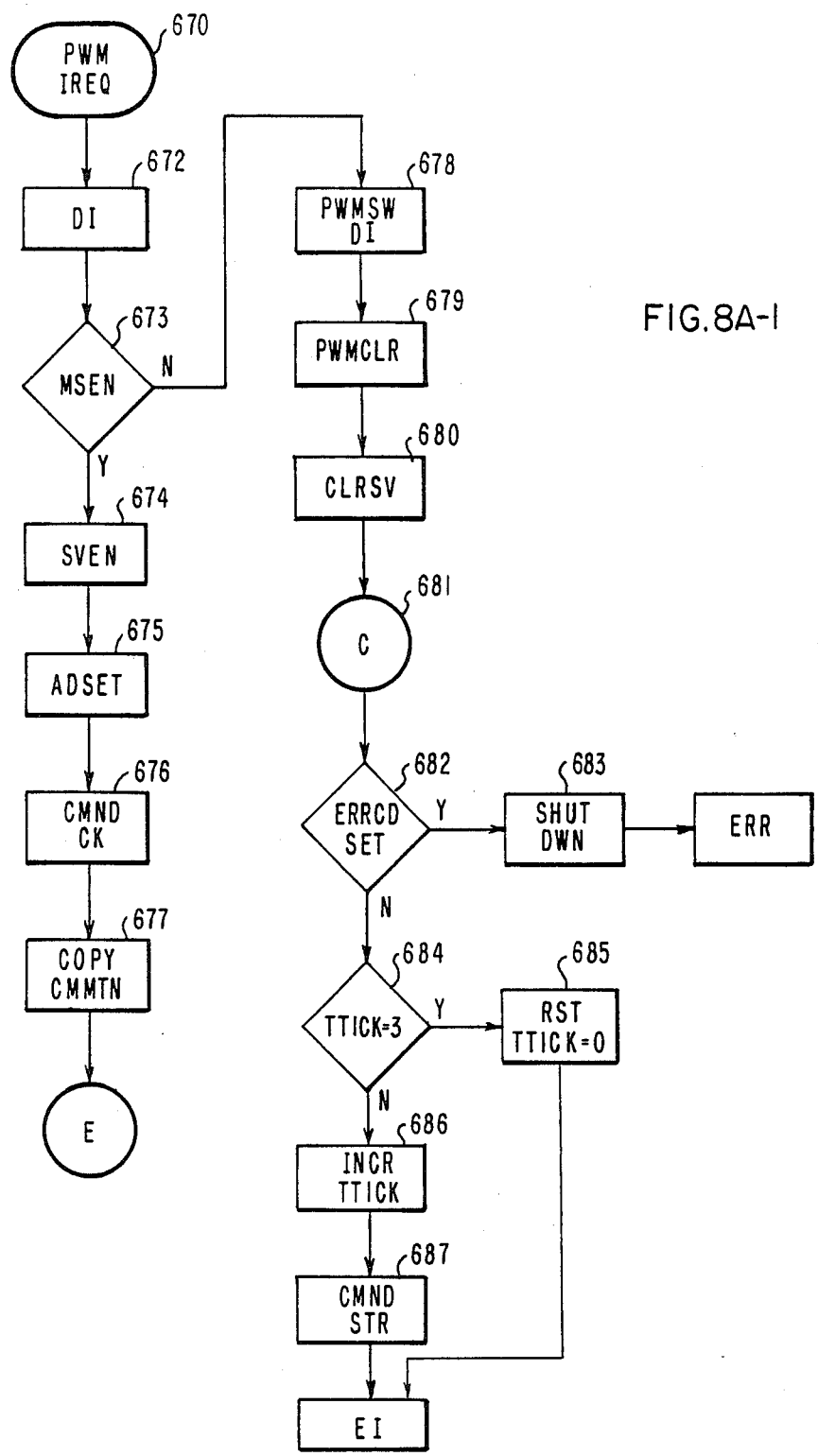
Figures 2, 8A:
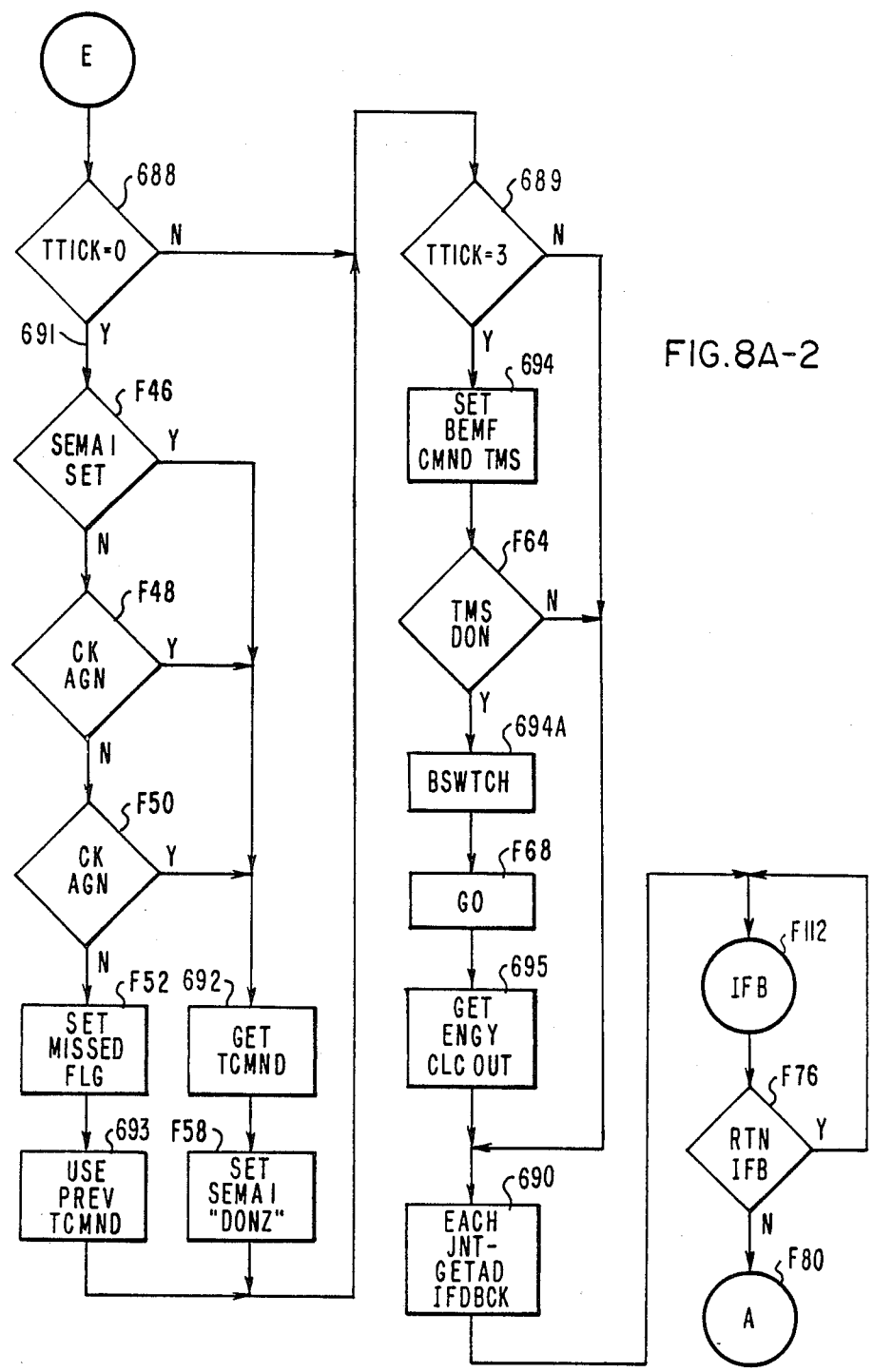
Figure 8:
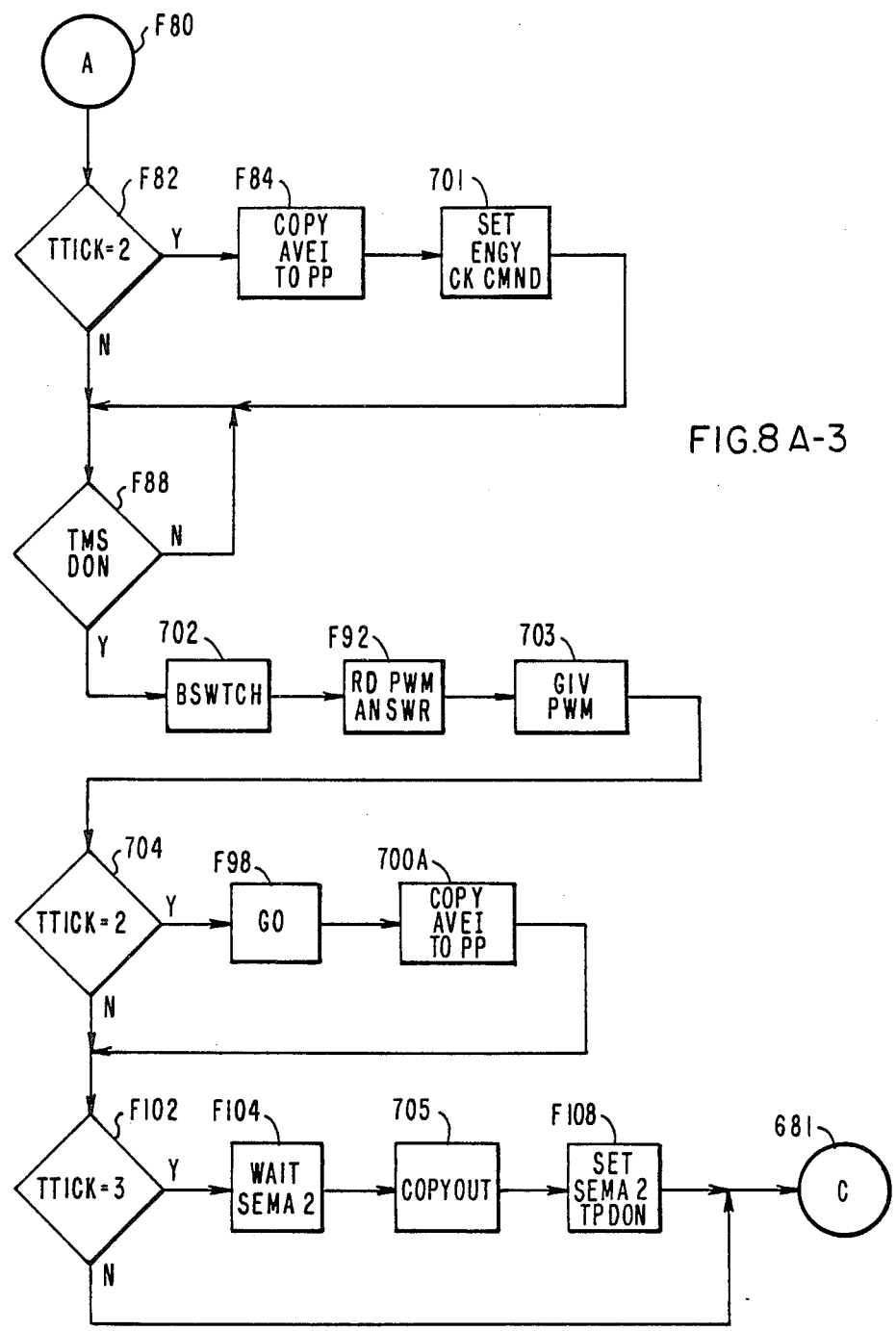
Figures 4, 8A:
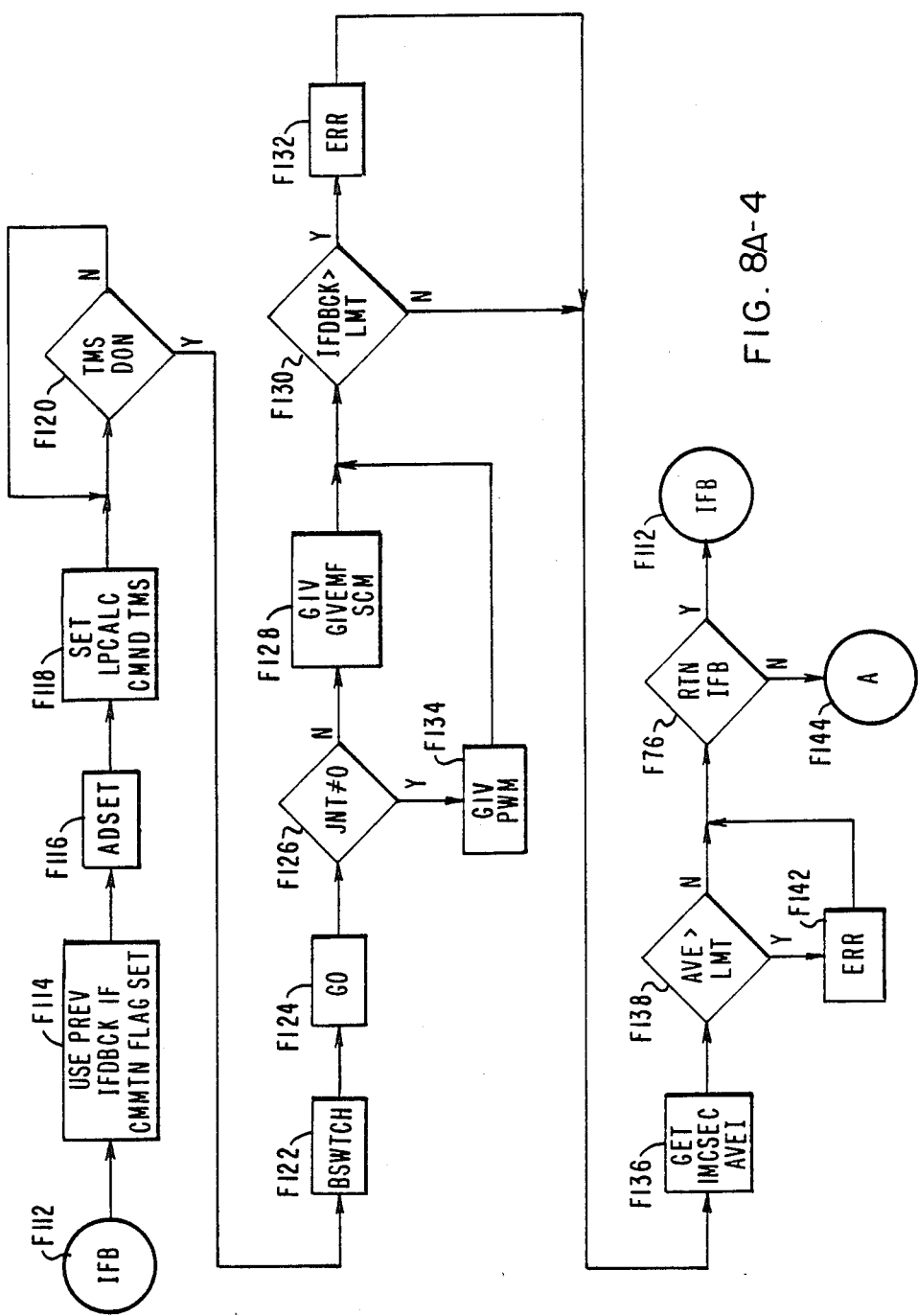
Figure 8B:
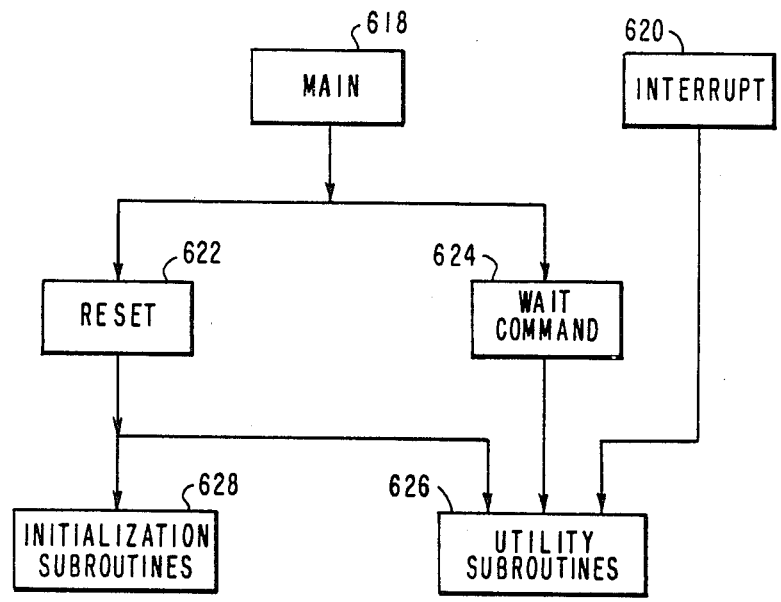

Referring to FIG. 8B, torque control management programs include a main program 618 and an interrupt program 620. Generally, the main program 618 includes a reset subprogram 622 which provides the initialization service programs 628 needed at the arm interface and torque processor control levels for startup of TP board operation. The reset subprogram 622 additionally signals the higher SCM control level when the TP board 600 is ready for operating commands.

Thereafter, a wait command subprogram 624 administers the execution of diagnostic and other high priority nonmotion commands from the higher SCM control level. During motion control, torque commands are periodically generated, preferably each millisecond, and transferred under the control of the torque manager interrupt program 620, detailed in FIGS. 8A-1 to 8A-4 through the ping-pong memory 608 to the torque loop calculator 610 in FIG. 6A-2. The interrupt program 620 is operated cyclically by interrupt signals generated at the sampling rate (preferably every 250 microseconds) by an interrupt clock located in the lower level AIF board 800. The interrupt clock also provides the timing control for generation of the SCM torque commands every millisecond.

The interrupt program 620 in turn performs various administrative functions needed to support the operation of the torque loop calculator 610 as it performs torque calculations for each of the six axes of the robot arm during each interrupt cycle. Voltage commands resulting from torque loop calculations are routed from the ping-pong memory 608 for storage in the TC data base memory 616 and then through a data bus 607 and bus interface, preferably the VMX type, to the AIF board circuitry for conversion to pulse width modulated signals by the axis drives. Current and status feedback data is also transferred from the VMX bus 607 for storage in the TC data base memory 616 and subsequent routing through the ping-pong memory 608 for use in the torque calculator 610.

The bus 607 operates in the specific embodiment in accordance with VMX specifications for timing and signal pin number association. However, full VMX bus specifications associated with arbitration, multiple bus masters, and 24-bit address capability are not supported. Further, certain signals not specified in the VMX bus specifications are employed for control, interrupt, and error condition status information.

Various subroutines 626 are employed by the reset and wait command subprograms 622 and 624 and the interrupt program 620. The reset subprogram 622 also employs initialization subroutines 628.

Figure 8C:
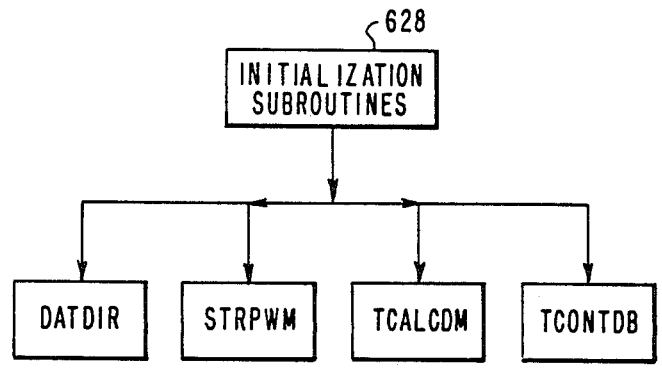
Figure 8D:
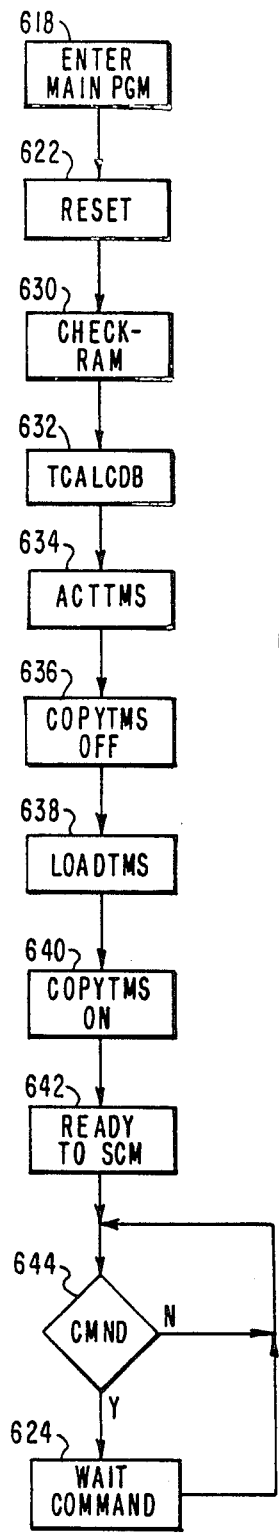
Figure 8E:
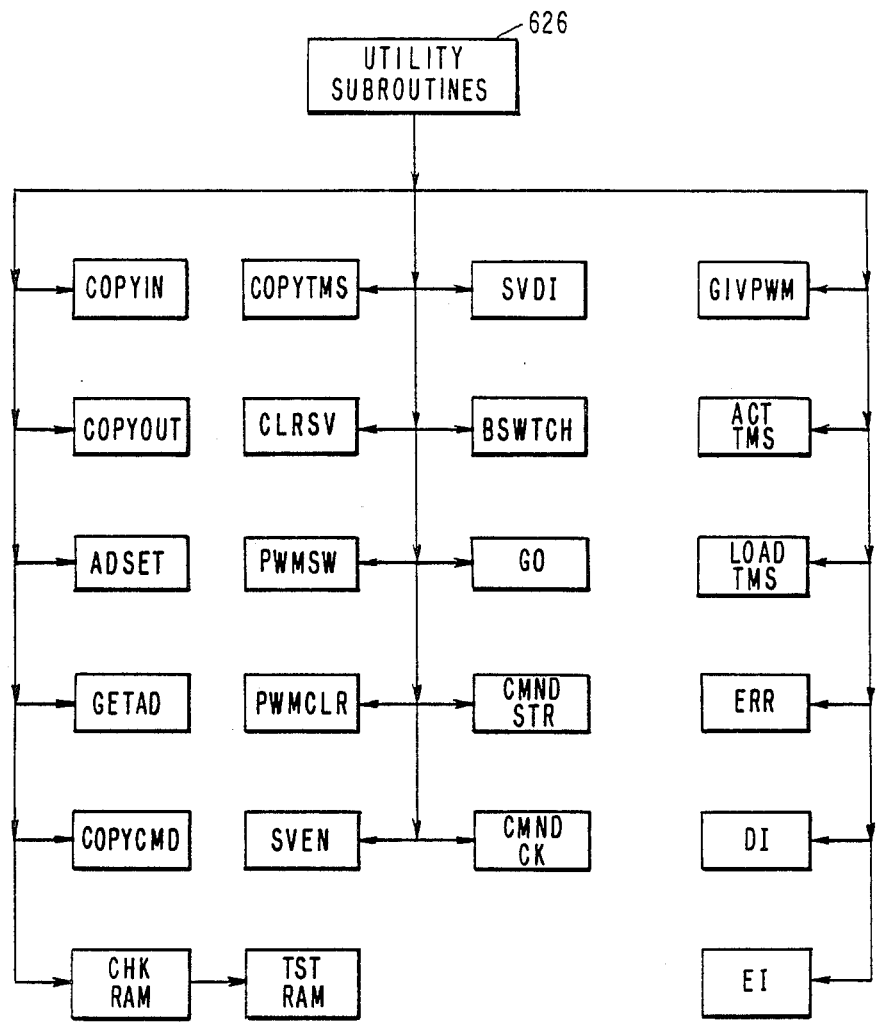

As shown in FIG. 8E, the utility subroutines include the following with the functions indicated:

CHECKRAM—preselected memory diagnostics—check all RAM memories on board 600.

RAMTEST—apply bit tests to selected memory locations.

GETAD—enable transfer of analog input to memory.

AD-SET—set analog/digital converters in feedback channels.

COPYIN—copy specified parameters for 6 arm joints from torque control data SCM interface memory 604 to TC data base memory 616.

COPYOUT—copy specified parameters for 6 arm joints from TC data base memory 616 to torque control data SCM interface memory 604.

COPYTMS/S-COPYTMS—copy to/from TC data base memory 616 and ping-pong memory 608.

COPYCMD—copy command from TC data base memory 616 to ping-pong memory 608.

CLRSERVO—clear on-line torque loop calculation data in TC data base memory 616 and ping-pong memory 608.

PWMSW—on/off switch for PWM chip which is located in the arm interface control level and normally generates power amplifier commands for the arm drives.

PWMCLEAR—zero output command to PWM chip.

SVENABLE—specify maximum voltage command acceptable for execution.

SVDISABLE—hold PWM at zero output.

LOADTMS—download program to RAM memory 611 for the torque loop calculator 610.

ACTTMS—activate/deactivate torque loop calculator 610.

GIVPWM—apply voltage command to PWM chip.

COMMCHECK—receive position feedback data for all 6 drives and set respective flags if different from the next previous data.

COMMSTORE—store commutation state for all 6 joint motors.

GO—send GO signal to control register 630 (FIG. 6A) for torque loop calculator 610.

BSWITCH—switch command for ping-pong memory 608.

ERR—report error to higher SCM control level.

DI—disable execution of interrupt program 620.

EI—enable execution of interrupt program 620.

The initialization subroutines 628 employed in the reset subprogram are shown in FIG. 8C and include the following:

DATDIR—create in the TC data base memory 616 a data directory for the SCM interface memory 604.

STRPWM—store PWM I/O address in TC data base memory 616.

TCALCDB—clear and initialize the torque loop calculator data base in the internal RAM memory of the torque loop calculator 610.

TCONTDB—clear data base parameters in the TC data base memory 616.

Program Flow Charts for TP Board Microprocessors

The main program 618 of FIG. 8B is illustrated in greater detail in FIG. 8D. Once the torque processor board 600 is started, the torque control manager 602 enters the main program 618 and executes the reset subprogram 622 to provide initialization service. As a result, the identification code for the torque control manager 602 is written onto the VME data bus 606 in FIG. 6A-2 via the dual port SCM interface 604 for communication to the higher control levels that may be packaged together in any particular robot application.

In addition, all semaphores are set to the same invalid state and the torque loop calculator 610 is cleared and reset. The local input/output hardware latch 630 in FIG. 6A-1 operates as a selector for hardware or software control for the torque loop calculator 610 and a flag is set to enable control from the torque control manager 602 when the software control flag is set.

In its final phase of execution, the reset subprogram 602 calls the utility subroutine PWMEN and a signal is thus generated for the next lower control level (arm interface level) to clear the arm drive circuitry and specifically to switch a controlling digital device referred to as the PWM chip to the OFF state.

The main program 618 continues the start-up procedure by calling the utility subroutine CHECKRAM in block 630 to provide memory diagnostics on all RAM memories on the TP card 600. Next, the initialization subroutine TCALCDB is called as indicated at 632 to clear/initialize the torque loop calculator data base in the TC data base memory 616.

The torque loop calculator 610 is then activated to the ON state by the subroutine ACTTMS as shown at 634. Next, the utility subroutine COPYTMS is called in block 636 to disable data copy to and from the TC data base memory 616 and the ping-pong memory 608. The utility subroutine LOADTMS is then called to download the TMS programming to the memory 611 as indicated at 638.

In block 640, the utility subroutine COPYTMS is again executed to enable copy to and from the TC data base memory 616 and the ping-pong memory 608. A signal is then generated by block 644 for the next higher SCM control level that the TP board 600 is now ready for robot control operation.

During subsequent active robot control operation, the main program 618 enters a wait command mode in which it undergoes continuous looping operating awaiting special high priority commands that may be generated by the higher SCM control level. Thus, block 644 determines whether a special command has been sent down to the TP board 600. Looping continues on the block 644 until a command is detected at which time the wait command subprogram 624 is called. After its execution, the command detection loop is re-entered until the next SCM command is received. In the block 644, SCM command detection is performed by looking at semaphore 3 to determine whether a flag has been set to signify that the higher SCM control level has downloaded a special command to the TP board 600.

Figure 8F:
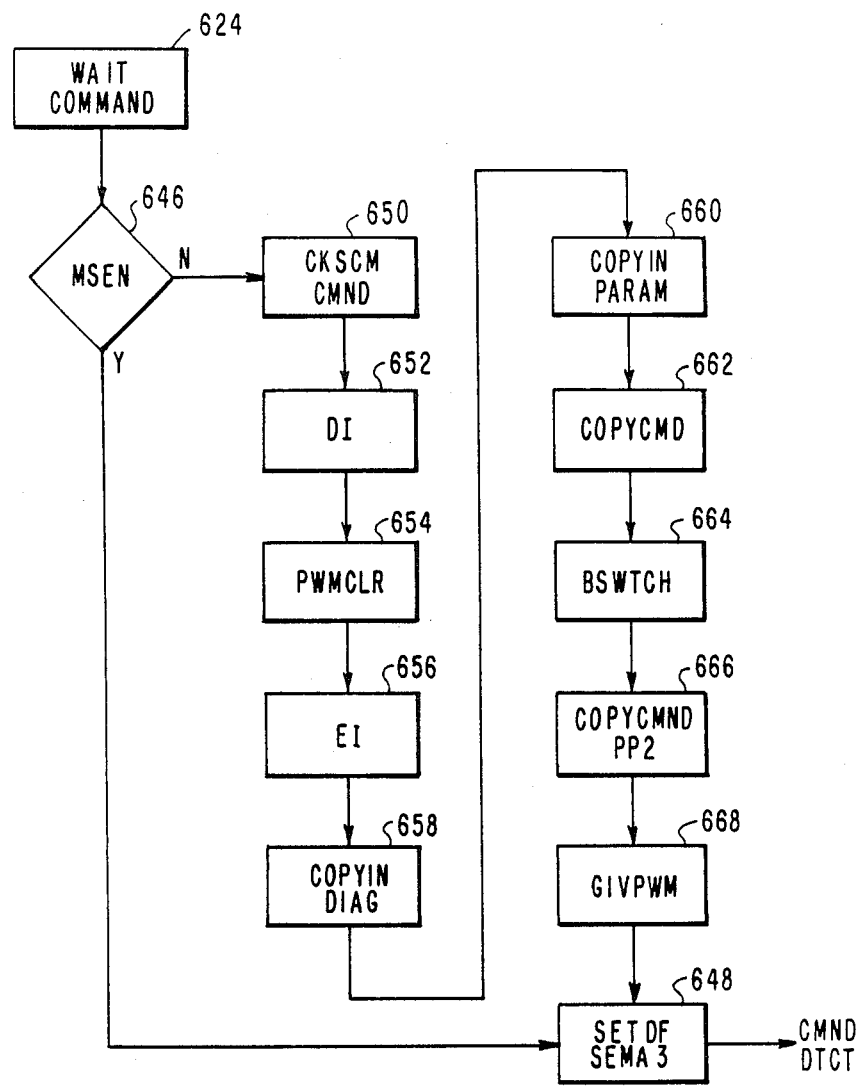

As shown in FIG. 8F, the wait command subprogram 624 first determines whether the system is ready for controlled robot arm motion, i.e., whether the higher SCM control level has just generated a master servo enable signal as indicated in block 646. In the master servo enabled mode, the SCM control generates a series of torque command signals for execution by the TP board 600. Preferably, the torque commands are generated once each millisecond as clocked from the AIF control level.

If a master servo enable signal has been generated to provide priority motion control, block 648 sets the semaphore 3 flag down acknowledging to the higher SCM control level that the command has been received and that a response has been taken. The wait command subprogram then returns to the SCM command detection loop as robot arm motion control is implemented.

On the other hand, if the master servo is disabled, block 650 first checks an SCM command setup bit and block 652 next disables interrupt program execution since a command having higher priority than motion commands must be ascertained and implemented. Block 654 then calls the subroutine PWMCLEAR to set the output voltage command to zero. Next, the interrupt program is enabled to resume arm motion control on an interrupt control basis.

In blocks 658 and 660, a determination is made whether a diagnostic command or a parameter change command has been downloaded, and the SCM command is copied by the subroutine COPYIN in the TP data base memory 616 for execution. Block 662 executes the utility subroutine COPYCMD to transfer the command to bank 1 of the ping-pong memory 608. Thereafter, BSWITCH is executed by block 664 to enable block 666 to transfer the SCM command to bank 2 of the ping-pong memory 608. In turn, the torque loop calculator 610 then executes the SCM command, and block 668 generates a signal for the SCM control level that the downloaded SCM command has been executed. The block 648 then sets the semaphore 3 down flag and program execution continues as previously described.

The interrupt program 670 is shown in greater flow chart detail in FIG. 8A-1 through 8A-4. It is initiated as indicated at block 670 in FIG. 8A-1 once the interrupt clock signal from the AIF board 800 is enabled in the wait command subprogram 624. Thereafter, it is executed at the control loop sampling rate, i.e., the interrupt rate of once every 250 microseconds.

Block 672 disables the interrupt and block 673 determines whether the master servo is enabled to permit robot control. If it is, the SV-ENABLE, ADSET, COMMCHECK and COMMSTORE utilities are executed in blocks 674–677.

If the master servo is not enabled, i.e., robot control is not permitted, PWMSW subroutine is executed in block 678 to disable PWM motor control chips on the AIF board 800 and the utilities PWMCLR and CLRSV are executed in blocks 679 and 680.

Thereafter, an end interrupt branch 681 is entered and block 682 checks for shutdown errors. Block 683 executed robot shutdown if shutdown error exists. If block 684 detects that the interrupt clock tick (generated every 250 microseconds) has reached a 3 count in the current millisecond common cycle time, block 685 resets the counter to 0 and the program ends. If not, block 686 increments the counter, block 687 stores the motor commutation states and the program ends.

With reference to FIG. 8A-2 for the case of an enabled master servo, blocks 688 and 689 check for a tick count of 0 and 3. If neither exists, block 690 next gets the current feedback for each robot axis. If the tick count is zero, branch 691 gets the new torque command (box 692) or, if missed, uses the previous torque command (box 693). At the tick count of 3, back emf command is set to TMS (box 694) and energy calculation output is obtained (box 695) and the ping-pong memory switch is set (box 694A).

The routine for fetching current feedback and performing other functions to be performed after each tick is designated as IFB, and it is looped in FIG. 8A-4 until the six axes have been completed. As shown, in FIG. 8A-4 the ping-pong memory switch F122 is set, PWM voltage commands are outputted by box F134 and BACKEMF is outputted by box F128. Limit checks are also made at F130 and F138. Thereafter, the program is branched to F80 via F76.

On return to main program branch F82 in FIG. 8A-3 box F84 copies average current to the ping-pong memory and box 701 sets the energy check command if the tick count is 2. Box 702 sets the ping-pong memory switch and box 703 outputs PWM voltage commands once TMS operations have been performed via F88.

Block 704 in FIG. 8A-3 again checks the tick counter and if the count had not been but is now 2, block 700A copies average current to the ping-pong memory. Thereafter, flags are set and certain data is copied out in block 705 if the tick count is 3 in block F102. Finally, the end interrupt branch 681 in FIG. 8A-1 is entered to close out the execution of the interrupt program 620 using instructions shown at 682 to 687.

TP Calculator

Figure 8G:
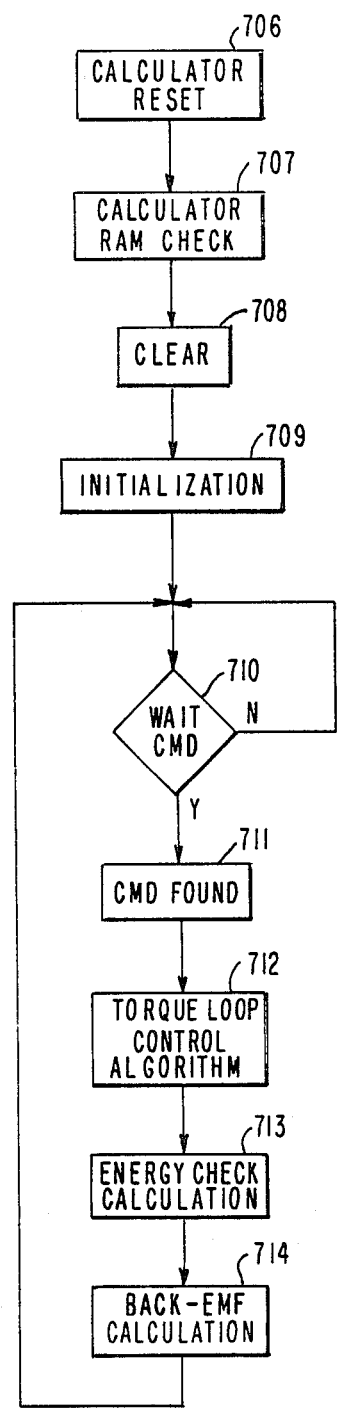

Programming for the TP calculator 610 is shown in FIG. 8G. A MAIN program 710 to 714 is executed cyclically at the sampling rate, and blocks 706, 707, 708 and 709, respectively, provide calculator (TMS) reset, and calculator (TMS) RAM check, clear and initialization. Block 710 thus waits for a torque command from the torque manager 602 of FIG. 6A-1.

When block 711 indicates availability of a torque command, the torque loop control algorithm is executed by box 712 for all six joint motors. Then, energy calculations are made in block 713 and back emfs are calculated in block 714 prior to ending the program execution.

Control Algorithms

A more detailed diagram of the torque control loop portion of the overall robot control is shown in FIG.

7B-1. The following control algorithms are executed in the torque loop calculator 610 in the implementation of the torque control loop portion of the overall robot control loop arrangement.

PI Control Algorithm

This algorithm is described in terms of a 250 microsecond sample period.

(1) Input:

| torque command | Tc | from SCM (1 ms. update rate) |
|---|---|---|
| feedback torque | T | from A/D converter (250 micro sec. update rate) |

Tc, T are scaled as follows: 10 significant bits stored in 16-bit quantity left justified with a sign bits. This format is selected to simplify the A/D interfacing.

```
              SDDD DDDD DDXX XXXX
```

| Output: | | |
|---|---|---|
| PWM command | PWMout | to PWM command register (250 micro sec. update rate) |

(2) Principle:

$$PWMin = Kp \frac{(s + 1/tau)}{s} * Terr$$

$$Terr = Tc - T$$

Kp: torque loop proportional gain tau: time constant of integral (mechanical time constant of motor)

(3) Algorithm

```
                    /* get error */
T(n) = (input data from A/D)
                    /* normalize the size */
Terr = (Tc(n)*2**10 - T(n)*2**10)/2**16
                    /* compute next integral */
temp(n) = integ + KI * Terr
                    /* check the integration limit */
if (temp <= - intlmt) then temp = -intlmt
if (intlmt <= temp) then temp = intlmt
                    /* store the integral value for next time */
integ = temp
                    /* get PI result */
temp = integ/2**16 + KP * Terr
                    /* check the overflow */
if (temp > 78FF) then temp = 78FF
if (temp > 8680) then temp = 8680
                    /* now linearize the PWM* */
if (temp >= 200) then PWMout = temp + 700
if (200>temp >=0) then PWMout = temp *2 + 500
if (0>temp >= FDC0) then PWMout = temp *2 + FB80
if (FDC0 > temp) then PWMout = temp + F980
```

KI = (KP/tau)*Ts
Ts = sample period = 250 micro sec.

(4) Scaling of KP and KI (i) dimensions
kp:[V/N−M]
tau,TS:[sec]

| Torque | Current | Terr*2**6 | PWMout | Motor Volt |
|---|---|---|---|---|
| N−M | A | bits | bits | Volt |
| >----Kt----- | Kad--- | KP*2**−16 | -----Kpwm-------> | |
| <=============================Kp==========================> | | | | |

| Kt | torque - current gain | [A/N−M] |
|---|---|---|
| Kad | A/D converter gain | [bit/A] |
| Kpwm | PWM gain | [V/bit] |

(ii) equation

Kt*(Kad)*KP*(2**(10-16))*Kpwm = Kp
Kp = Kp*(2*6)/(Kt*Kad*Kpwm)
KI = KP*Ts/tau

Note:
1. If A/D converter full scale is +/− Imax then Kad = 2**15/Imax [bit/A]
2. If PWM chip and power block gain is +/− Vmax then Kpwm = Vmax/2**15 [V/bit], therefore, Kad*Kpwm = Vmax/Imax [V/A]

Back-emf Algorithm

The back-emf EMF calculation is used to provide an estimate of motor speed for safety purposes.

(1) Input:

| motor current | i | from A/D converter |
|---|---|---|
| motor voltage | Vin | from PWM command register |
| Output: | | |
| Back-emf | VEL | estimated velocity |

(2) Principle:

| VEL = w*Ke = Vin − (L*di/dt + iR) | |
|---|---|
| R = motor resistant | [ohm] |
| L = motor inductance | [H] |
| Vin = motor terminal voltage | [V] |
| Ke = motor Back-emf constant | [V/rad/sec] |
| w = motor velocity | [rad/sec] |
| i = motor current | [A] |

(3) Algorithm:

VEL(n) =[PWMout*2**9 − MOTL*
        i(n)−i(n−1) − i(n)*MOTR]12**16
where:
i(n) is A/D value shifted right 6 bits and accumulated 1 mesc/Ts times (running 1 msec average).
Ts is PWM sample rate = 250 micro sec (4) Scaling of L, R:

(i) equations:
MOTR = 2**13 * Imax/Vmax * R(ohm)
MOTL = 2**13 * Imax/Vmax * 1/delt * L(H)
SV   = 2**-8 * Vmax
where Krpm = (SV/KE) * VEL (ii) example:
Vmax = 300V, Imax = 20A, R = 0.49 ohm, L = 5.5 mh
KE   = 120V/Krpm, delt = 4 msec
MOTR = 268, MOTL - 751
Krpm = 9.76 * 10**-3 * VEL

| Vin | PWMout | VEL | VELemf |
|---|---|---|---|
| V | bits | bits | bits |
| ---Kpwm------- | --2**-9--- + | ----2**-16*SV---- | 1/KE--- |

| Iin | | | |
|---|---|---|---|
| A | | Kpwm | = Vmax/2**15 |
| ---Kad--2*2-6)--MOTR- | | Kad | = 215/Imax |
| --MOTL- | | | |

Energy Check Algorithm

The energy check calculates motor energy and alarms the SCF when energy exceeds a specified limit for a specified period of time.

(1) Input:

| current | CUR1 | 1 msec averaged current |
|---|---|---|
| energy limit | ELIMIT | from SCM (constant) |
| time constant | TAU | from SCM (constant) |

-continued

| | | |
|---|---|---|
| Output: | | |
| alarm | ECODE | to SCM |

(2) Principle:

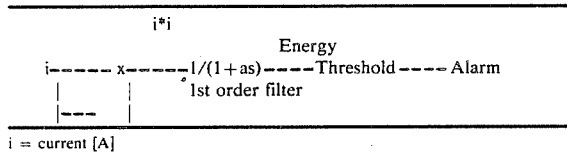

i = current [A]

(3) Algorithm:

```
temp = CUR1**2 - ENERGY
ZOENGY = ZOENGY + temp
ENERGY = ZOENGY / 2**16 * TAU
if ENERGY > ELIMIT
         then ECODE = OVENGY
```

(4) Scaling:

| | |
|---|---|
| (i) | condition of alarm output<br>if step input of i**2 = k*limit is applied, then<br>output an alarm condition tx seconds after step<br>is applied. |
| (ii) | equation<br>a = delt * 2**16/TAU<br>TAU = delt * 2**16/a<br>    = about 20 to 40 for delt = 4 msec |

TP Cycling Operation

The cyclic operation of the TP circuitry is shown in FIG. 9 to clarify the manner in which the various control events are interselected. As shown by the upper scale, the SCM board 400 operates on a 1 millisecond cycle. The TP board 600 operates on a ¼ millisecond sampling cycle as shown by the lower scale. The four TP board sampling intervals are marked by ticks 0 through 3.

The latest torque commands are received by the torque manager 600 in the order shown in each sampling interval for the six joints on the 68K scale. With a 62.5 microsecond delay, the torque commands are transferred to the TP calculator in the same order. Current feedbacks are received at the beginning of each sampling interval for all joints and transferred to the TP calculator.

Torque Processor Software Comments

The following provides additional detail on the operation of the TP board:

Memory Map

As it is described in torque processor hardware document, the module has program EPROM, local RAM, shared RAM (VME), TMS ping-pong ram and TMS program RAM. The address is as follows:

| | | |
|---|---|---|
| 000000 | 007fff | EPROM |
| 034000 | 037fff | Shared RAM (VME address 900000-903fff) |
| 038000 | 03bfff | Local RAM |
| 03c000 | 03c3ff | Ping-Pong RAM (two banks) |
| 040000 | 041fff | TMS Program Memory |

Interrupt Signals

The 68000 microprocessor 602 has seven levels of user interrupts. All of these are vectored interrupts. In the TP hardware, three levels of interrupts referred to as level 7, 6 and level 5 are available. Level 7 is a non-maskable interrupt (NMI) which can be caused by two sources described below.

The following is a description of the interrupts used in the arm interface:

Level 7 (NMI):
(1) PWM chip fail or PWM down signal. Indicates problem in PWM chip or no new PWM command in 2 consecutive PWM cycles.
(2) Watch Dog Timer—time out.

Level 6 (PWMIREQ):
PWM interrupt request generated by PWM chip. Used to initiate torque loop calculations. 4 Khz (250 micro sec.).

Level 5 (VTICK):
1 msec servo cycle tick.

Hardware failure type errors such as address error is incorporated in the 68000 trap vectors.

PWM Gate Array

Figures 1, 2, 7B:
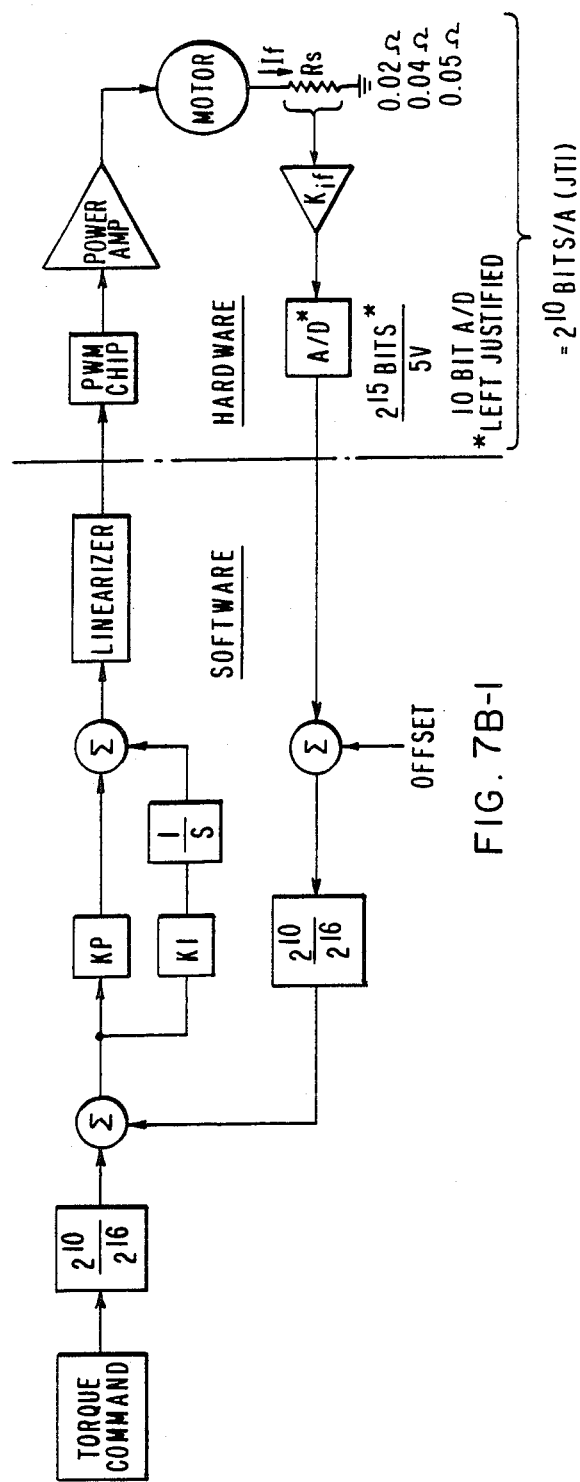

The PWM chip shown in FIG. 7B-1 has 8 bit mode and 16 bit mode operation. In the torque processor, 16 bit mode is used. For further details, refer to "GA1500 PRODUCT DATA" document.

| Address | Chip 1 |
|---|---|
| 80000 | PWM internal ramp counter register |
| 80002 | PWM control/status register |
| 80006 | PWM command register Jt1 |
| 8000a | PWM command register Jt2 |
| 8000e | PWM command register Jt3 |

| Address | Chip 2 |
|---|---|
| 80040 | PWM internal ramp counter register |
| 80042 | PWM control/status register |
| 80046 | PWM command register Jt4 |
| 8004a | PWM command register Jt5 |
| 8004e | PWM command register Jt6 |

Process Task Distribution

In order to optimize robot performance in a tight cycle time (250 micro sec.), the tasks are distributed among 68000 and TMS 320 as follows:
1. 68000
    1. Communication to the SCM
    2. Command Handling
    3. Current Sampling and Offset Storage
    4. Commutation State Reading
    5. Ping-Pong Memory Management
    6. PWM Chip Management
    7. Diagnostics
    8. Error Reporting
2. TMS 320
    1. Torque Loop Calculation
    2. Current Averaging
    3. Over Current Check (Absolute & Average)
    4. PWM Compensation
    5. Commutation Compensation
    6. Energy Check
    7. Back Emf Check Process Algorithm Loop is designed general enough to support brushless type motors for 860 series robots and RX robots and brush-type motors for PUMA series. In addition to electric motors, the torque processor will serve as pressure loop processor for hydraulic robots.

Interface to SCM

Figures 1, 6A:
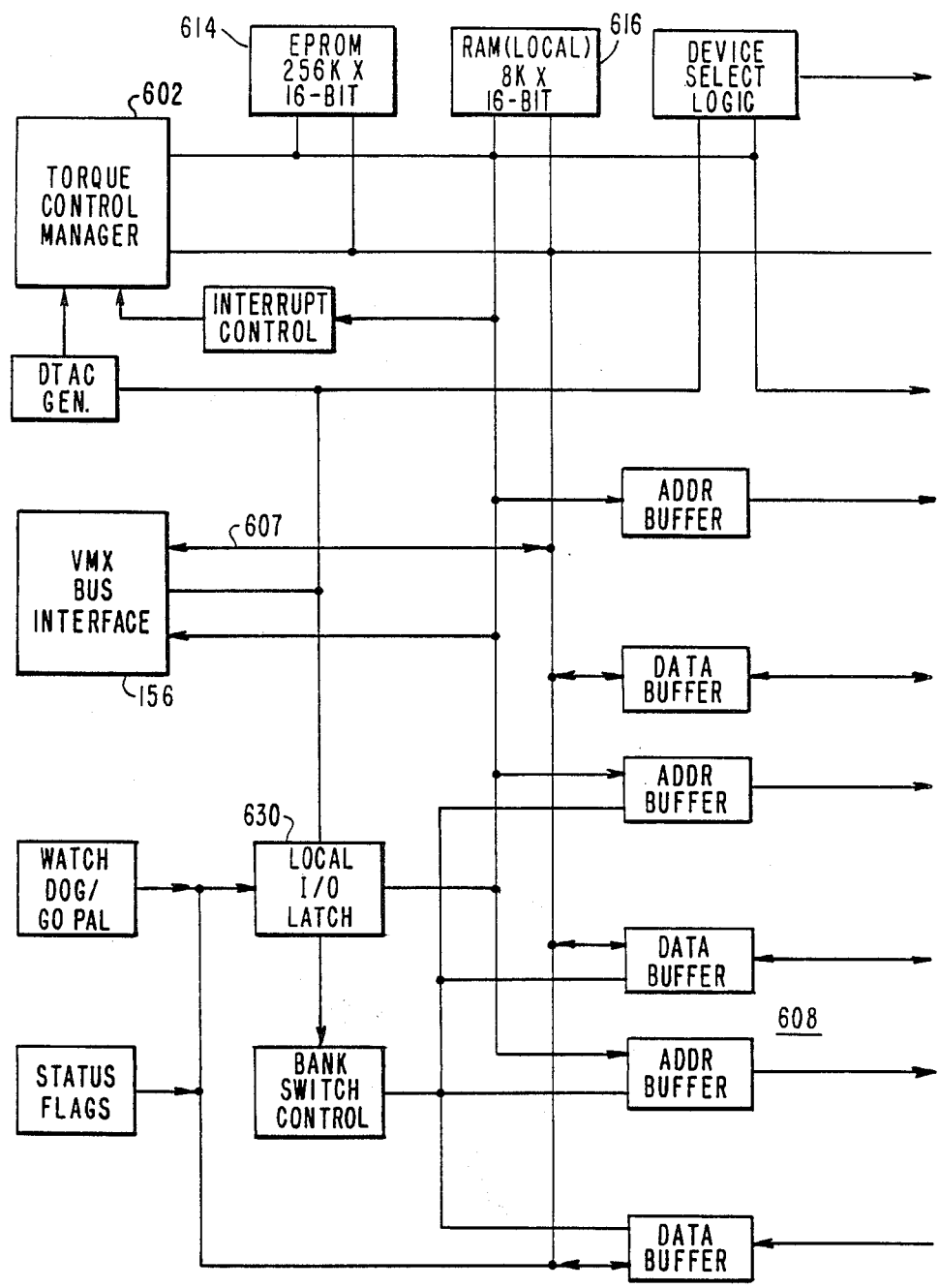
Figures 2, 6A:
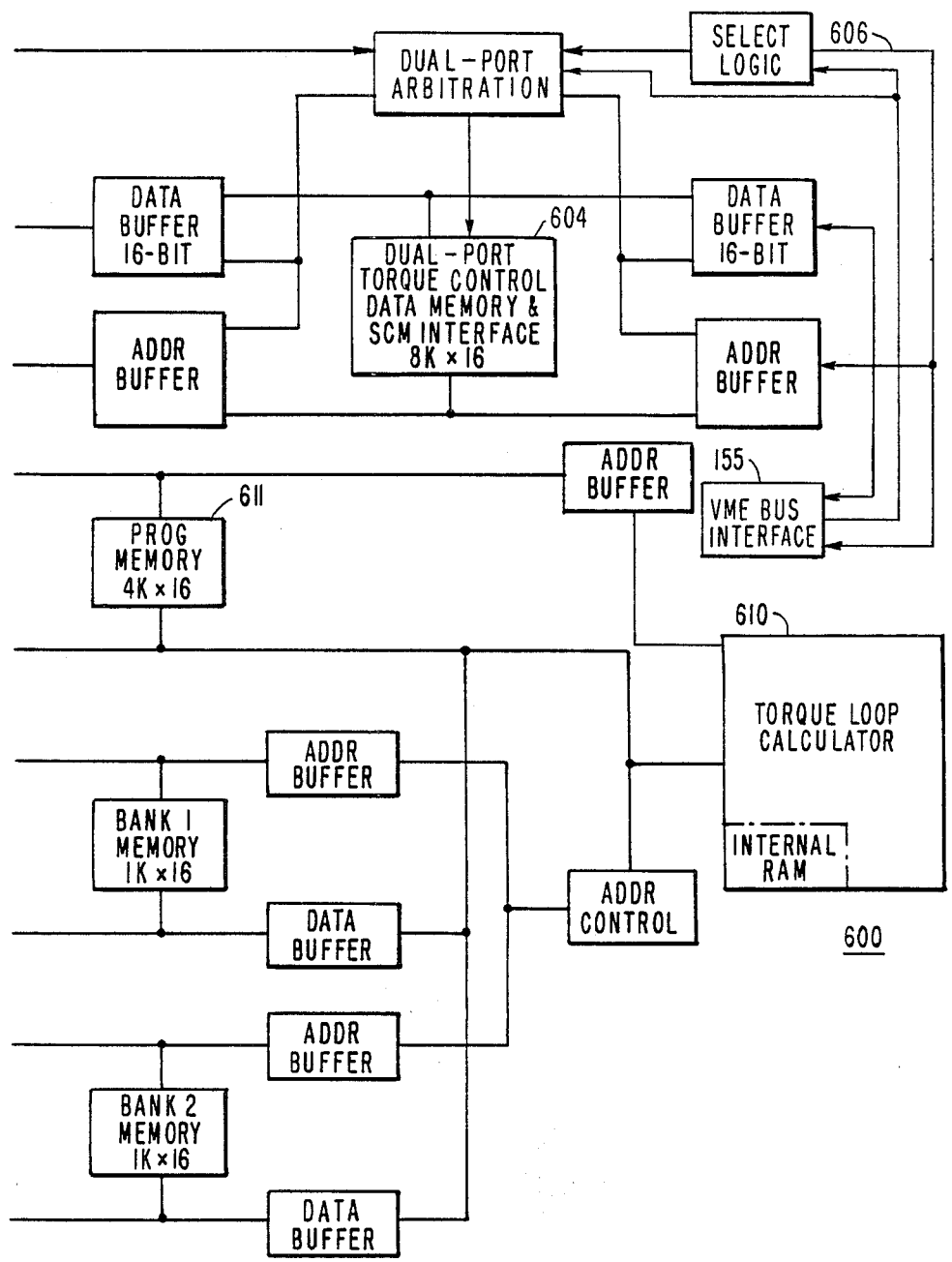

Since the software overhead time is to be kept to a minimum, two buffers shown in FIG. 6 are needed with semaphore in the shared RAM. In this way, two processors can write or read different locations simultaneously.

1. Buffer 1—Data from SCM
   Data from the SCM such as torque commands (1 msec) and parameters (>1 msec) must be written to this buffer.
2. Buffer 2—Data from torque processor
   Data from the torque processor as feedback and status must be written to this buffer.

Note:

Refer INTFSPEC04-Torque Processor Interface Communication Spec. (Appendix B).

Each buffer access will be controlled with the associated semaphore.

Semaphore—BUFFER1:
  SCM DONE—SCM finished writing
  TP DONE—TP finished reading
Semaphore—BUFFER2:
  SCM DONE—SCM finished reading
  TP DONE—TP finished writing
  (SCM DONE=55 h, TP DONE=AAh)

The process is as follows:

1. Initialize the semaphore-state to RESET=0.
2. The write processor writes data.
3. Set semaphore to WRITE PROCESSOR DONE.
4. Wait for 1 msec interrupt. (1 msec interrupt for SCM, 4th torque loop tick for TP.)
5. The read processor reads data.
6. Set semaphore to READ PROCESSOR DONE.
7. Go to Step 2.

Note:

The data logger will read the data when WRITE PROCESSOR is done; however, the data logger will not set semaphore at the completion of reading.

The double buffer operation timing is as follows:

|  | 1 msec tick | | |
|---|---|---|---|
|  | : | : | : |
| Buffer 1 |  |  |  |
| SCM | w | w | w |
| TP | r | r | r |
| Buffer 2 |  |  |  |
| TP | w | w | w |
| SCM | r | r | r |

Since the TP timing is very critical, the buffer data structure MUST be designed by the torque processor software designer. This is to take advantages of 68000 instruction set and TP hardware architecture.

Interfacing Between 68000 and TMS 320

TMS 320 interfacing is done via ping-pong memory exclusively with associated hardware circuits as shown in FIG. 6.

Downloadable Diagnostics

Downloadable diagnostics mechanism is provided to test out TP related hardware, namely PWM chips and A/D, without requiring special EPROM in the TP or plugging a development system such as EMULOGIC or tutor board.

Upon power-up, the host computer such as SCM or Mizar CPU can download a TP diagnostics to the reserved shared RAM located (902000h to 903fffh) in the TP. When the normal start-up procedure such as self-diagnostics and initialization are completed, the SCM or other master device can issue diagnostics command to the TP (write 4000h to location 900004h). The moment the TP acknowledges the command, it will CALL subroutine located in 902000h and return to the background task. It must be noted that the TP address and VME address is different, therefore all downloadable diagnostics must be relocatable.

Servo Control Board—Position/Velocity Control Embodiment of Multiprocessor Servo Control A servo control module (SCM) or board 400 (FIG. 4) is structured in accordance with the modular architecture of the robot control system to operate as a core board for a complete basic robot control and generate arm solutions from stored robot program commands or to operate as part of an expanded robot control and receive for implementation arm solutions produced from robot program commands by the higher level system cntrol board 350. The generation of arm solutions involves the execution of robot control functions including robot program language interpretation, path planning, trajectory calculations (intermediate position commands and axis coordination) and transformation of position information between Cartesian and robot joint and robot tool coordinate systems. The SCM board 400 additionally provides communications interfacing with related peripherals and a host controller if provided.

The SCM board 400 is provided with program controlled digital circuitry to implement arm motion control loops for the robot control system. Motion control is achieved for each axis through a control loop arrangement which preferably includes interrelated position, velocity, and acceleration control loops from which torque commands are developed for implementation by the torque processor module 600. The digital servo control is a coordinated multiprocessor servo control that generates output torque commands from (1) position and velocity commands provided for each axis by the arm solution and (2) position and velocity feedback signals obtained from the position encoders and the tachometers through the arm interface module 800.

In the SCM control loop operation, a position error is calculated for each axis from the applied axis position command and the axis position feedback. A velocity error is calculated for each axis from a velocity command derived from successive position commands and from the axis velocity feedback. Preferably, the position and velocity control loops are operated in parallel, i.e., the position and velocity errors are summed to produce a torque command for the torque control loop on the torque control module 600. Additionally, an acceleration command preferably is derived from successive velocity commands and applied in a feedforward acceleration control loop which generates an acceleration based torque command for summation with the position and velocity errors in generating the SCM output torque command.

The frequency with which loop calculations are made is selected to produce robot arm motion which is fast, accurate, smooth and stable. For example, the frequency employed can be such as to provide a trajectory cycle of 32 milliseconds as in the present case. If desired, a faster trajectory cycle, i.e., as short as 8 milliseconds, can be achieved.

SCM Digital Circuitry

As observed in FIG. 10A-1 and 10A-2 the SCM board 400 of FIG. 4 generally comprises two sections, i.e., a local processor section 401 and a system resource section 403. The system resource section 403 employs a bus 405 and provides functions related to the overall robot control system and not specifically related to execution of the position and velocity control loops.

These functions include EPROM 408 for storage of the robot arm solutions, battery backed-up RAM for storage of non-volatile data, static RAM 412, real-time clock 415, a DMA controller 414 and two multi-protocol, dual channel communications controllers 416 and 418.

The system resource area is implemented as dual-port memory. As such, equal access to the system resource section is provided from either a local processor 401 or from the VME bus 420. The system resource functions appear as a bus slave to the VME bus. This provides the capability for these related functions to be controlled either from the SCM local processor, or from an optional processor connected to the system bus.

In the local processor section 401, the SCM digital circuitry includes coordinate digital coprocessors and interface and resource circuitry needed for specified performance, i.e., to provide control calculations and control data management needed for accurate and efficient control of all axes and to provide interfacing communication with a host controller, peripheral devices and other robot controllers. Preferably, a servo control manager 402 operates with a servo calculator 404 which functions as a slave processor principally to make position and velocity control loop calculations (i.e., feedback filters, loop gains, position and velocity errors, etc.).

The servo control manager 402 directs control, status and program data to and from the SCM board 400 and to and from the servo position/velocity control calculator 404. The servo control manager 402 can be a Motorola 68000 which has a high data processing capability. By separating data management and control calculation tasks in accordance with the respective capabilities of the processors 402 and 404, a basic circuit organization is provided as a basis for achieving substantially improved control performance with manufacturing and user economy.

In the illustrated embodiment, implementation of the local processor section of the SCM board 400 is based on usage of a 68000 processor as the servo control manager 402 and two coprocessors. Both coprocessors serve as peripheral devices to the 68000. One of the coprocessors 406 (preferably National Semiconductor 32081), provides floating-point calculation capability when arm solutions are to be provided by the SCM board 400. The other coprocessor, or slave processor, is the position/velocity servo calculator 404 and is implemented with a Texas Instruments TMS-32010 Digital Signal Processor. The position/velocity processor provides high speed fixed point calculation capability.

The remaining functions which are a part of the local processor section include local memory, both EPROM 422 and RAM 424, a peripheral timer/counter device, interrupt control 430, and system error monitoring devices 428. The local processor 402 can serve as a master to the VME bus for access to the TPM or other related type functions. However, the SCM board 400 does not provide VME bus system controller type functions which normally include system reset generation, bus arbitration for access to the bus and system bus clock generation, since these functions are implemented on the arm interface board 800.

The SCM board 400 is arranged to provide as much systems flexibility as is reasonably possible, and to obtain the maximum performance from available large scale integrated (LSI) circuitry. This is one of the reasons that the DMA and communications facilities are implemented in the system resource area as opposed to being directly connected to the local processor bus. This architecture not only frees the servo control manager 400 from direct intervention in communications data movement, it also eliminates the local processor bus communications related overhead, thus allowing high speed serial communications to be conducted without significant impact on program execution time in the servo control manager 400. Also, by placing these functions in the system resource area, these facilities can be operated by any other optional processor with capability of serving as a VME bus master. This would then totally free the servo control manager 400 from communications related processing. This organization allows the complete functionality required for a robot control system to be implemented in a cost effective manner and on a minimal set of boards while also allowing increased performance controllers to be implemented without impacting the overall system design.

Another significant area is the interface between the servo control manager 402 and the servo calculator 404. Here, a special dual port memory organization, referred to as "ping-pong" or "bank switched" memory allows either processor to communicate with the other without impacting the processing performance of either processor.

For more detail on the SCM circuitry, reference is made to copending patent application Ser. No. 932,991.

Programmed Operation of Servo Control Board

As schematically shown in FIG. 11B, the program system for the servo control data manager 402 comprises a background program 450 called MAIN and a cyclically operated foreground interrupt routine 452 called SERVO. When the system is started as indicated to RESET, an initialization routine 453 is executed prior to continuous running of the MAIN program 450. In addition to the cyclically executed SERVO interrupt 452, an interrupt routine 454 called C$UNEX operates in the foreground on demand to process unscheduled or unexpected interrupts. Further, a special highest priority routine 457 called the watch dog timer interrupt functions in response to operation of the external watch dog hardware.

Where the robot control system includes the system control board 500 in FIG. 4 for higher performance through higher computing capacity, the MAIN program provides for receiving and distributing position commands from the system control board 500. In the minimum or basic robot control system configuration, the system control board 500 is not included and the MAIN program 450 further performs arm solutions to generate position commands locally on the servo control board 400. Additional description on the minimum robot control is presented subsequently herein.

The rate at which the MAIN program 450 is interrupted for the cyclical execution of the SERVO routine 452 is controlled by the signal VTICK generated once each millisecond on the VME bus 155 from the arm interface board 800. The basic functions provided by the SERVO routine 452 are:

(1) transfer control data to and from the servo calculator 404;
(2) transfer control data to and from the torque processor board 600;
(3) receive sensor feedback data over the VME bus 155 from the arm interface board 800;
(4) interface to the supporting background task RDMASC in FIG. 11D;
(5) perform synchronous data logging;
(6) perform one shot data logging;
(7) place broadcast data in a blackboard storage area;
(8) shut the system down if serios error conditions occur.

The initialization routine is shown in greater detail in FIG. 11C. The process essentially comprises the performance of a series of tasks as indicated in the successive blocks in FIG. 11C. The following list provides further information on the nature of these tasks:

| TASK | INITIALIZATION |
| --- | --- |
| INISRC | bit-bus emulator for handshake |
| INSCROM | feedback interface |
| INIFIX | global variables |
| INCONF | robot default configuration |
| INTMS | servo calculator-download program store |
| INIAIB | torque processor board 600 |
| INROB | robot software configuration |
| INJTMS | bank switch memory |
| INJONT | joint data structure via servo calculator program memory and torque processor board shared RAM reads |
| INBUF | internal buffer management areas |
| INIDLC | one shot and synchronous data logger interface |
| CRTINI | input/output hardware-servo control board 400 |
| BBINIT | bit-bus emulator interface and handshake with system control board 350 |

Once the system is initialized, the MAIN program 450 (FIG. 11D) begins continuous cyclical background execution. As shown in FIGS. 11E and 11F, a routine 456 called RDMASC is run to provide ongoing reading of system position commands from the bit-bus emulator which is a designated memory area in shared RAM where system commands are deposited when received from the system control board 600.

Viewed as a whole, the background and interrupt routine can take on the following finite servo states:
0—Start-up state
1—Initializing state
2—Calibrating state
3—Servo disabled state
4—Servo enabled, hold state
5—Servo enabled, moving state The background task is responsible for assuring that valid state transitions occur, and for sequencing the interrupt task to new states. The interrupt task is therefore written to accept "commanded" states and to supply "current" states. In addition, the background task is sequenced via commands from the bit-bus emulator. The following state transition table defines this operation:

| Current State | Command ID from bit-bus | | | | | | | | | |
| --- | --- | --- | --- | --- | --- | --- | --- | --- | --- | --- |
|  | 36 | 17 | 45 | 1 | 16 | 34 | 20 | 2 | 18 | 46 |
| 1 | −1 | −1 | −1 | −1 | −1 | 2 | −1 | −1 | −1 | −1 |
| 2 | −1 | 3 | −1 | −1 | −1 | 2 | −1 | −1 | −1 | −1 |
| 3 | 3 | 3 | 3 | 4 | −1 | −1 | −1 | 3 | −1 | 3 |
| 4 | 4 | −1 | −1 | 3 | −1 | −1 | 5 | 4 | 4 | 4 |
| 5 | −1 | −1 | −1 | 3 | 4 | −1 | 5 | −1 | −1 | −1 |

Where a "−1" indicates an illegal state transition. The bit-bus commands are defined as follows:
36—Where command
17—Calibrate command
45—Install servo parameters command
1—Enable/disable servos command
16—Hold command
34—Initialize command
20—Normal motion command
2—Brake command
18—Limp command
46—Upload current servo parameters command Generally, a set of position commands is generated for the servo loops once each Valcycle, in this case once every 32 milliseconds. In turn, each Valcycle is measured by Vticks which are generated on the VME bus once every millisecond. There are thirty-two (32) Vticks in each VALCYCLE in this case.

A cycle counter named TCKCNTR counts the Vticks in each VALCYCLE. A running counter called UNICNTR keeps a summing count on Vticks up to $2^{31}$ ticks.

When the next previous VALCYCLE has been ended as indicated by the UNICNTR in block 457, block 458 operates on the beginning of the new VALCYCLE when TCKCNTR=1 to initiate reception of the new set of position commands for the new VALCYCLE. Thus, block 459 reads the new commands from the bit-bus emulator.

If the command includes an emergency command (such as disable servo), block 460 directs the emergency command to an emergency command buffer. Block 461 sends motion (position) commands to a motion command buffer. Similarly, block 462 sends the non-motion commands to a non-motion command buffer.

The blocks 460, 461 and 462 perform like basic functions. First, the command is read from the bit-bus emulator in shared RAM. Next, prescribed checks are made to validate the command. Finally, the command is routed to the designated buffer in local non-shared internal RAM.

If no direction is found to transfer a system command to an internal RAM buffer, block 463 records a no command error and prepares an alternate command (same as last command or a shutdown if this is the second occurrence of this no command error).

Next, blocks 464 and 465 send a response to the system control board 350 that the newest command has been received when the value of the tick counter nears the end of the current VALCYCLE, i.e., when it equals the VALCYC minus three. Block 466 next repeatedly polls UNICNTR until RDMASC is to be re-executed to receive the next system command.

When a VTICK occurs (i.e., once every millisecond), RDMASC is temporarily interrupted for execution of the SERVO routine 452. As shown in the flowchart in FIG. 11A, the SERVO routine 452 first performs needed bookkeeping and overhead tasks as indicated in block 470. For example, the watchdog timer is reset for the 2 millisecond interrupt. If the tick is a long tick, i.e., the tick counter equals one to mark the start of a new VALCYCLE, block 471 performs certain additional overhead tasks. The basic functions performed are: reset tick counter to 1; route the new position command from the system control board to the servo calculator; and process changes of state in the SERVO routine.

Loading Data For Switching to the Servo Calculator

If the tick is a short tick, i.e., an intermediate tick in the 32 tick cycle, or after long tick overhead has been performed, block 472 prepares for transferring data to the servo calculator by loading data to the bank switched memory according to the state in which the servo calculator is to be.

The flowchart in FIG. 11F shows the servo calculator setup in greater detail. If block 473 finds the calculator is to be in the start-up state, block 474 fetches data needed for start-up logic for downloading to the servo calculator 404 in FIG. 10A-1. For the initialization state, blocks 475 and 476 fetch initialization command data for downloading to the servo calculator 404. Similarly, calibration command data is readied for the servo calculator 404 by blocks 477 and 478 for the calculator calibration state.

If the calculator is to be disabled, blocks 479 and 480 load into the bank switched memory a disabled command. Finally, if the calculator state is to be hold or moving, which covers most of the operating line, blocks 481 and 482 load motion command data into the bank switched memory. If none of the listed states are detected, block 483 records an error.

Data Flow and Timing

Figures 1, 12A:
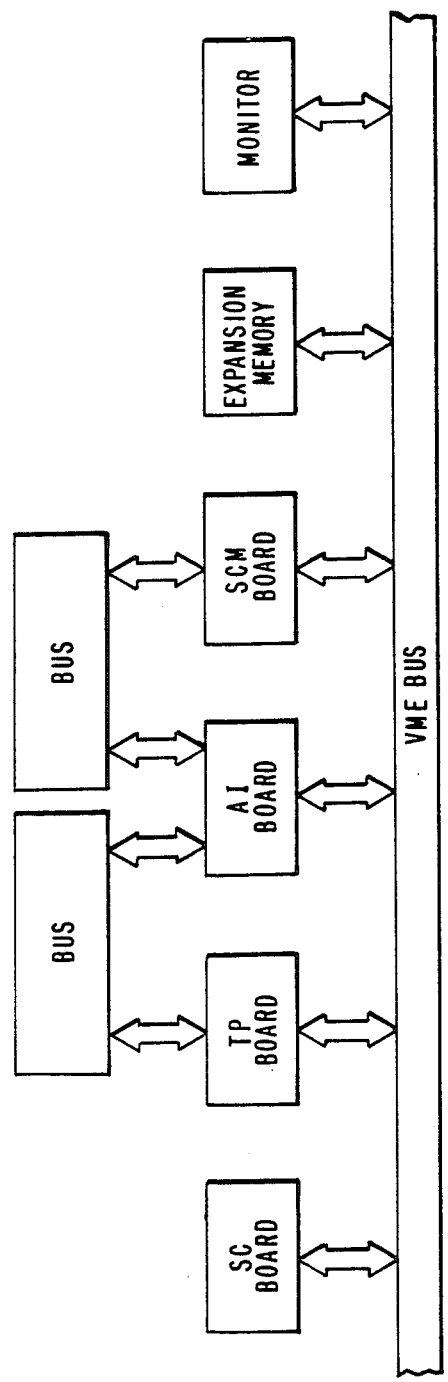
Figures 2, 12A:
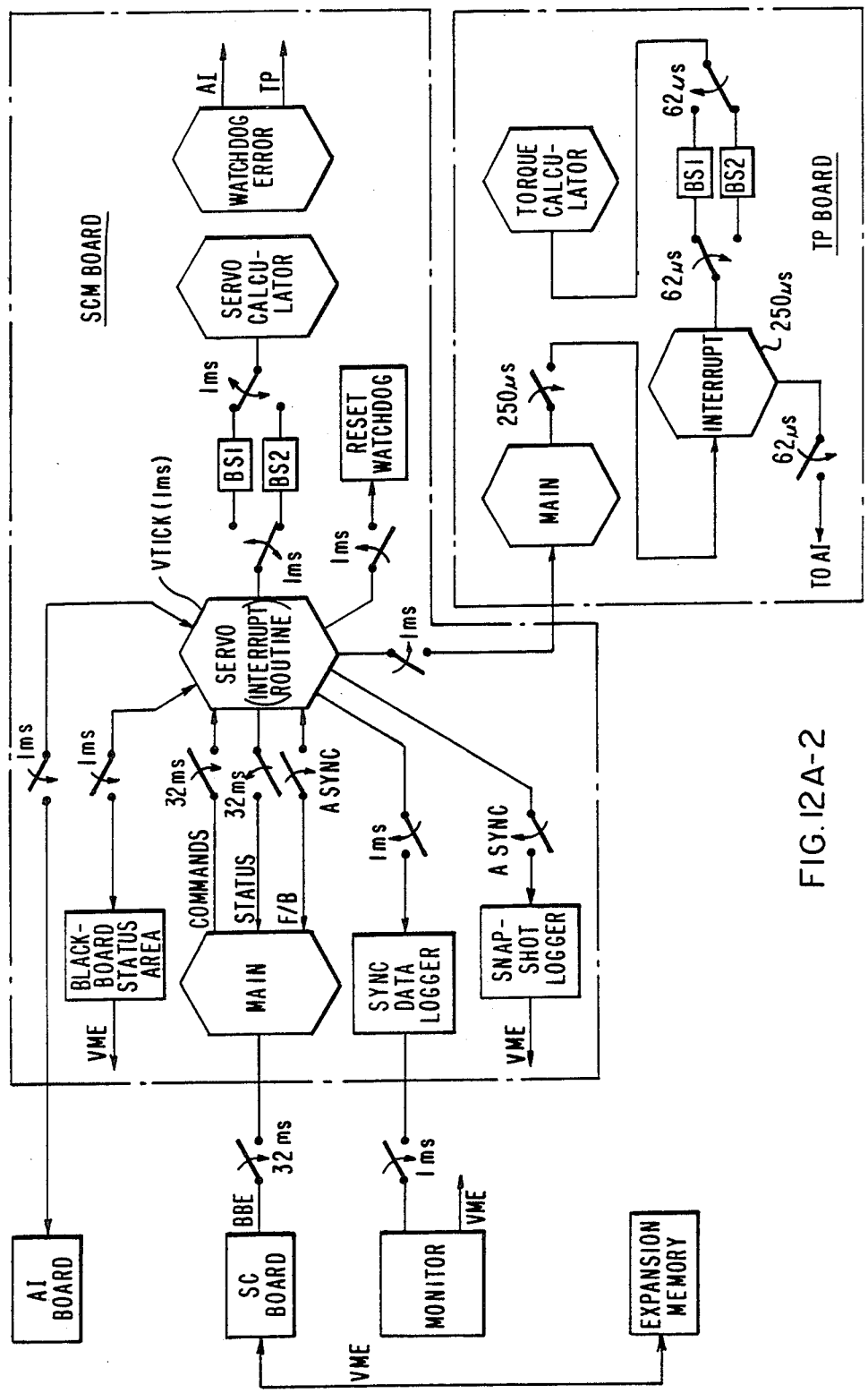

In the HOLD/MOTION state, control data generally flows as follows as seen in overview FIG. 12A-2. Once every VALCYCLE, i.e., once every 32 milliseconds in this case, position command data for all axes is received by the servo control board main program from the system control board and shuttled through the bank switch memory to the servo calculator. Feedback data (position and velocity) is generated for each axis every millisecond and it is transferred to the servo calculator through the bank switched memory every millisecond by the servo control data manager through operation of the servo interrupt routine.

The servo calculator computes a torque command every millisecond for each axis from the command and feedback data. In turn, the torque commands are transferred every millisecond by the servo control data manager from the bank switched memory to the torque processor board. On the TP board, torque calculations based on torque commands and current feedback are performed to generate motor voltage commands for all axes every 250 microseconds.

Switching Data to the Servo Calculator

Figure 11A:
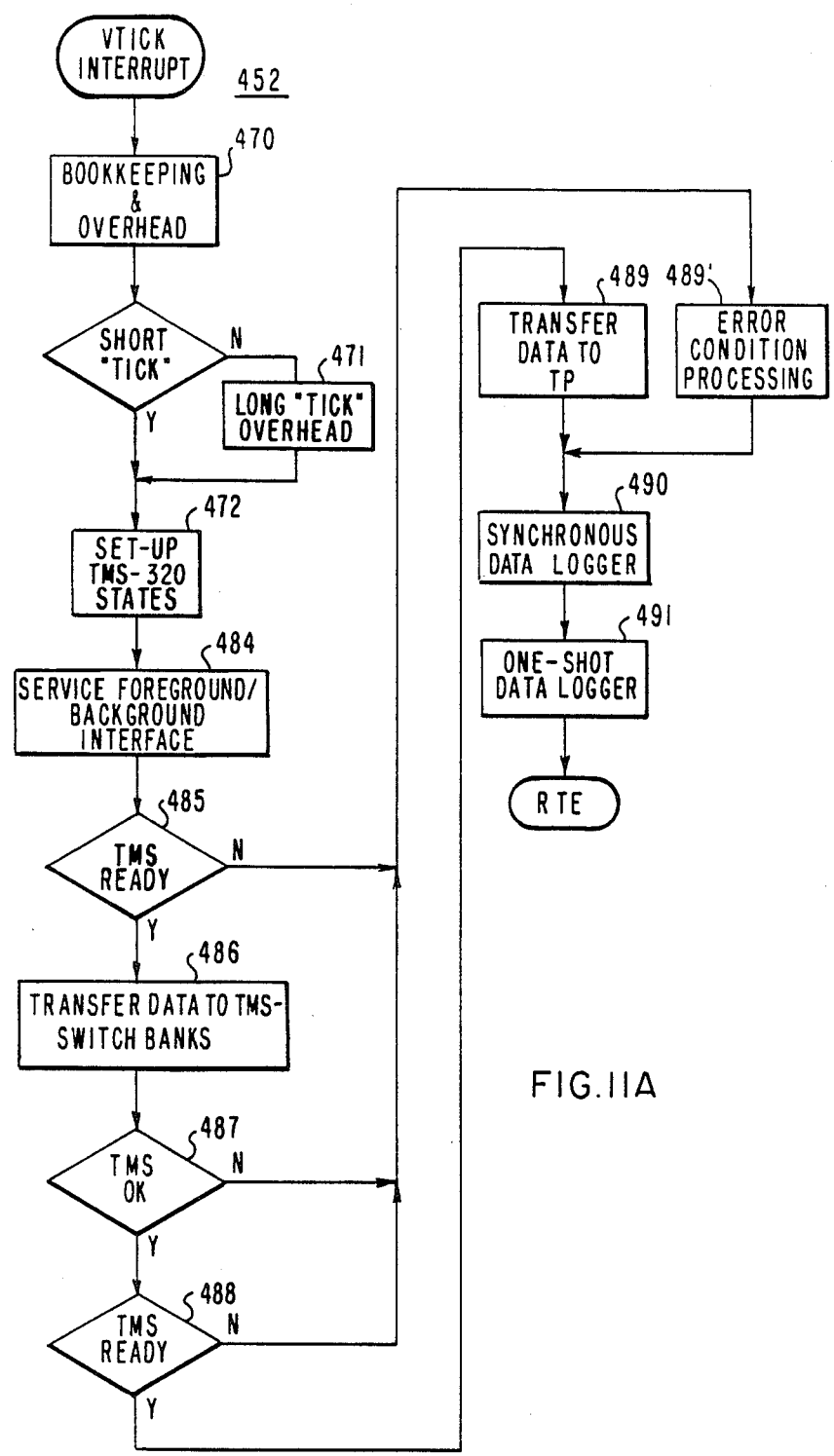
Figure 11E:
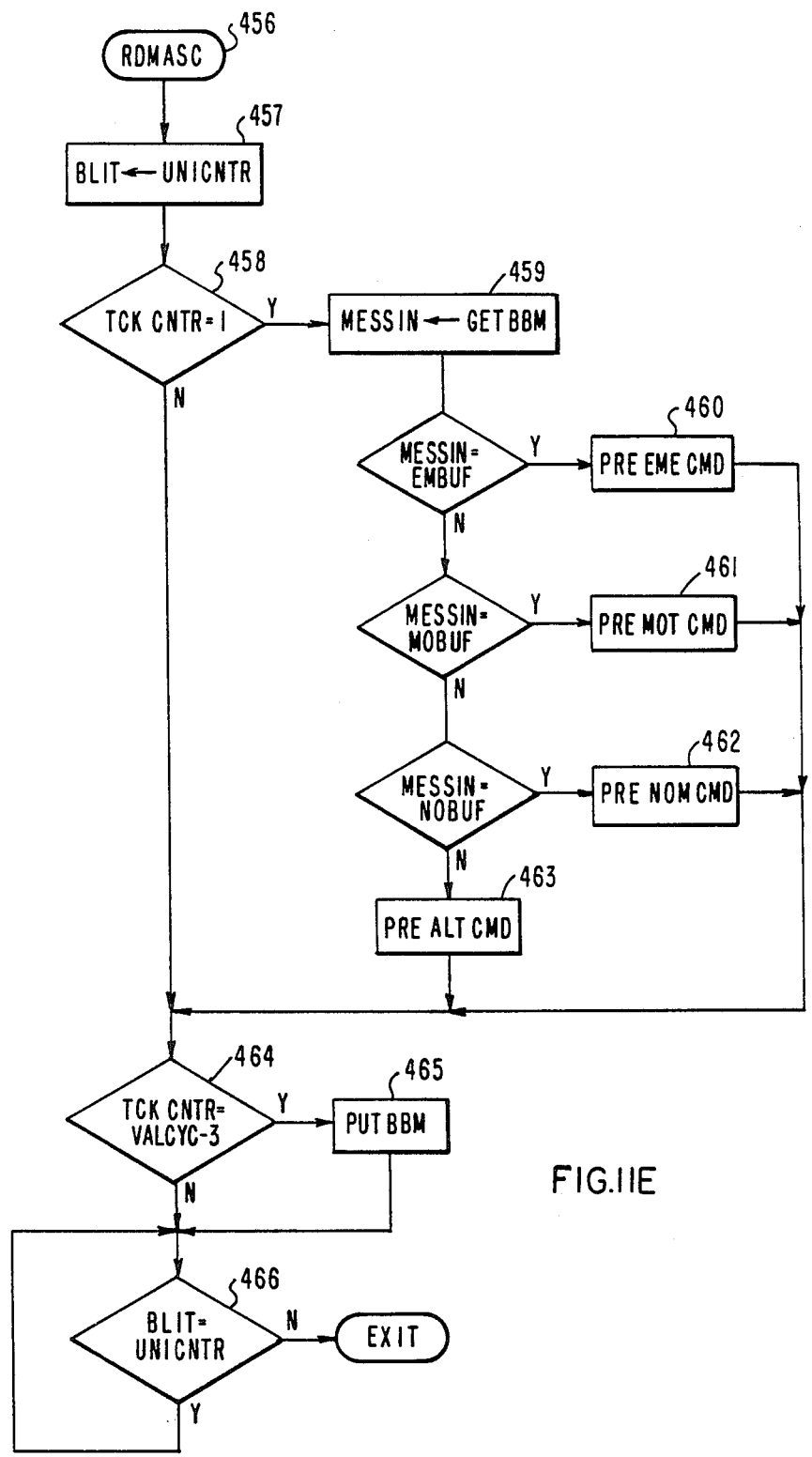
Figure 11F:
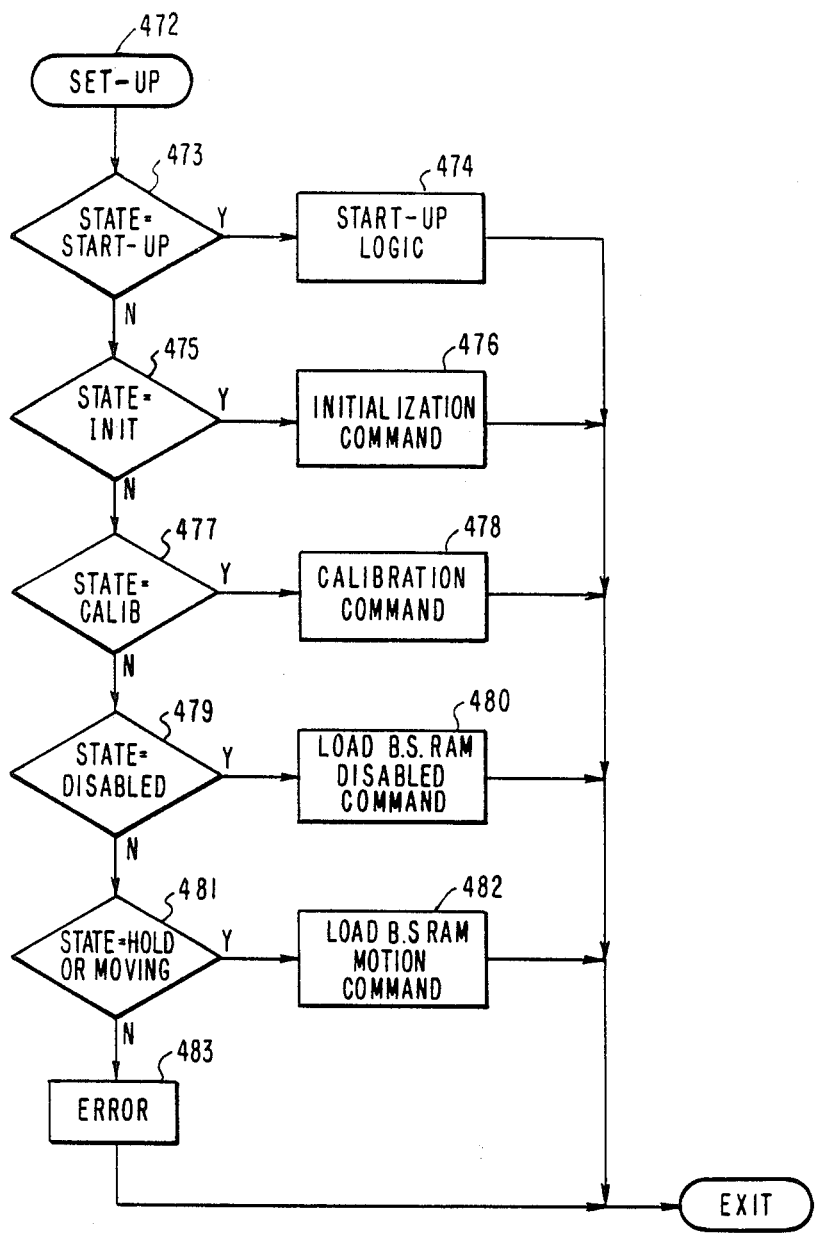

Afer completion of the setup subroutine 472 in FIG. 11A, block 484 performs whatever data transfer service is needed for the foreground/background interface within the servo control data manager 402 of FIG. 10A-1.

"Mailbox" Interface for 68K Foreground/Background Tasks

In order to effectively use the interrupt routines in the 68000 microprocessor (68K) of servo control data manager 402 it has become necessary to perform various asynchronous "setup" operations in the background task, while using the foreground task(s) to instantiate the changes. This approach allows the foreground tasks to have complete control of subordinate processors and devices. It also allows the less time critical setup to be spread out over several servo cycles. (In this discussion background refers to the non-interrupt task.)

A shared RAM mailbox interface was chosen to allow the background routine to communicate a list of tasks to be performed by the foreground routine. Each task request is encoded into a "packet" which contains the information required by the foreground task. The packet structure was designed to be simple yet as generic and efficient (in terms of decoding and execution costs) as possible. The following table describes the format of the interface:

| Offset (bytes) | | Contents |
| --- | --- | --- |
| 0 | | Semaphore byte (1=Full, 4=Empty) |
| 1 | | Number of Packets (requests) |
| 2-3 | | \| → Command Field |
| 4-5 | first | \| Message size (number of 16-bit words) |
| 6-9 | packet | \| FROM Address Field |
| a-d | | \| → TO Address Field |
| e-15 | Second packet (items 2-d from above) |
| 16-1d | Third packet |

For the servo interrupt routine the elements in each packet are interpreted as follows (descriptions assume a single packet is presented):

Command Field (CF):

---

CF > 0 : TMS 320 servo command
   \*Load CF into the TMS command list (see "TMS
    Ping-Pong Memory Map")
   \*copy "message size" words from "FROM" and append to
    the TMS input buffer.
   \*set semaphore byte to "empty"
CF = 0 : Transfer data command
   \*copy "message size" words from "FROM" to "TO"
   \*set semaphore byte to "empty"
CF = −9999 : TMS reset command (allows direct writes to TMS
   program memory)
   \*disable (level 5 - VTICK) interrupts
   \*put TMS into reset state
   \*copy "message size" words from "FROM" and "TO"
   \*remove reset state from TMS
   \*set stick to bank 0
   \*enable (level 5 - VTICK) interrupts
   \*set semaphore byte to "empty"
CF < 0 : Multipass TMS 320 servo command
   \*set CF = −CF
   \*Load CF into the TMS command list
   \*copy "message size" words from "FROM" and append to
    TMS input buffer.
   \*DO NOT set semaphore byte to "empty".

Notes:
\*In order to avoid time consuming packet management for

-continued multipass commands, ALL packets will be reprocessed on the
second pass if ANY packet is of type Multipass.
*Because resetting the TMS results in automatically switching to bank 0 (which may not be the bank earlier packets were stored in), the TMS bank memory is NOT switched if a TMS reset command is present. Therefore these commands should be sent separately.
*Currently 300 (hex bytes of system resource RAM is set aside for the mailbox area and for free space to store the data. The following list of suggested global symbol names further defines the area.
List of Global Symbols

| | | |
|---|---|---|
| FB_SHR | 0x34900 | /* shared ram base address to start of /* foreground/background semaphore /* area */ |
| FB_SEM | 0x0000 + FB_SHR | /* ptr to FB semaphore byte */ |
| FB_NOP | 0x0001 + FB_SHR | /* ptr to number of packets (byte) */ |
| FB_CF1 | 0x0002 + FB_SHR | /* ptr to the first command field */ |
| FB_MAX | 0x0004 | /* maximum number of packets /* allowed */ |
| FB_DAT | 0x0032 + FB_SHR | /* ptr to area of free space to store /* data to be transferred to foreground /* task */ |
| FB_MXD | 0x02ce | /* maximum size of FB_DAT in /* bytes */ |
| FB_EMPTY | 0x04 | /* no command list */ |
| FB_FULL | 0x01 | /* command list present */ |

If block 485 in FIG. 11A detects that the TMS servo calculator 404 of FIG. 10A-1 is ready, block 486 transfers the previously prepared position command and/or other data to the calculator 404 through the ping-pong memory. If the block 485 or block 487 finds that the servo calculator 404 is in a defective state, an error shutdown is commanded. The following command list provides greater detail on the data transferred to the servo calculator.

Ping-Pong Memory Map

| Addresses | | | |
|---|---|---|---|
| 68k | TMS | Symbol | Contents |
| 3c000-3c007 | 0-7 | TMSCOM | TMS Command List |
| 3c010-3c09f | 8-4f | TMSIN | TMS Input Buffer |
| 3c0a0-3c0ff | 50-7f | TMSSTA | TMS Status Buffer |
| 3c100-3c11f | 80-8f | TMSTOR | TMS Torque Output Buffer |
| 3c120-3c21f | 90-10f | TMSLOG | TMS Logged Data Buffer |
| 3c220-3c7ff | 110-3ff | TMSGC | TMS General Communication Area |

Each of the buffers which comprise the 1k word ping-pong memory is described in detail below. The symbols shown in the table are simply suggested names to use for the start of each buffer to promote consistency between the 68k and TMS code. The buffers are organized such that the first two areas (TMSCOM and TMSIN) are read-only for the TMS (write-only for the 68k). The next three areas are write-only for the TMS and vise versa for the 68k. Whereas the final area (TMSGC) is a read/write area for both processors.

The TMS command list is simply a NULL command terminated list of task requests for the TMS to perform in a given cycle. Up to seven (7) commands can be included in a list. Each element is a 16-bit command used to direct the actions of the TMS. The preferred commands are as follows:

| Command | Action |
|---|---|
| 1 | Not currently used |
| 2 | Not currently used |
| 3 | Not currently used |
| 4 | Not currently used |
| 5 | Not currently used |
| 6 | Calibrate initial position and velocity |
| 7 | Calculate torque (execute servo with no cycle update) |
| 8 | Calculate torque (execute servo with cycle update) |
| 9 | Not currently used |
| a | Identify TMS servo parameters and version ID |

The TMS input buffer contains additional input data required by the TMS conditioned on the value of the command word and its relative location in the command list. Input data required by each command is stored sequentially in the same order as the commands in the command list. Currently this buffer has the following format if the command word=8 (e.g., a cycle or "long" tick); note that the organization of this table is by 16-bit "short" word count.

TMSIN if absolute encoders and tachometers are used (e.g. 860/rx)

| Word | Contents |
|---|---|
| 0 | Time stamp |
| 1 | Servo enable mask |
| 2 | Velocity scale factor |
| 3 | High word of position command for joint 1 |
| 4 | Low word of position command for joint 1 |
| 5 | Absolute encoder measurement for joint 1 |
| 6 | Absolute velocity measurement for joint 1 |
| 7-10 | Words 3-6 for joint 2 |
| 11-14 | Words 3-6 for joint 3 |
| 15-18 | Words 3-6 for joint 4 |
| 19-22 | Words 3-6 for joint 5 |
| 23-26 | Words 3-6 for joint 6 |

If the command word=7 (e.g., a non-cycle or "short" tick) the TMS input buffer assumes the following form:

| Word | Contents |
|---|---|
| 0 | Time stamp |
| 1 | Servo enable mask |
| 2 | Absolute encoder measurement for joint 1 |
| 3 | Absolute velocity measurement for joint 1 |
| 4-5 | Words 2-3 for joint 2 |
| 6-7 | Words 2-3 for joint 3 |
| 8-9 | Words 2-3 for joint 4 |
| 10-11 | Words 2-3 for joint 5 |
| 12-13 | Words 2-3 for joint 6 |

TMSIN for command=8 if ONLY incremental encoders are used (e.g., Puma line)

| Word | Contents |
|---|---|
| 0 | Time stamp |
| 1 | Index interrupt/servo enable mask |
| 2 | Carry (wrap) for position feedback |
| 3 | Velocity scale factor (1608 format) |
| 4 | High word of position command for joint 1 (in 3208 form) |
| 5 | Low word of position command for joint 1 |
| 6 | Encoder count/index for joint 1 |
| 7-9 | Words 4-6 for joint 2 |
| 10-12 | Words 4-6 for joint 3 |
| 13-15 | Words 4-6 for joint 4 |

-continued

| Word | Contents |
|---|---|
| 16-18 | Words 4-6 for joint 5 |
| 19-21 | Words 4-6 for joint 6 |

If the command word=7 (e.g., a non-cycle or "short" tick) the TMS input buffer assumes the following form when using incremental encoders:

| Word | Contents |
|---|---|
| 0 | Time stamp |
| 1 | Index interrupt/servo enable mask |
| 2 | Encoder count/index for joint 1 |
| 3 | Encoder count/index for joint 2 |
| 4 | Encoder count/index for joint 3 |
| 5 | Encoder count/index for joint 4 |
| 6 | Encoder count/index for joint 5 |
| 7 | Encoder count/index for joint 6 |

TMSIN for command=8 if absolute resolvers are used (e.g., 100 robot)

| Word | Contents |
|---|---|
| 0 | Time stamp |
| 1 | Servo enable mask |
| 2 | Velocity scale factor |
| 3 | High word of position command for joint 1 |
| 4 | Low word of position command for joint 2 |
| 5 | Absolute resolver measurement for joint 1 |
| 6-8 | Words 3-5 for joint 2 |
| 9-11 | Words 3-5 for joint 3 |
| 12-14 | Words 3-5 for joint 4 |
| 15-17 | Words 3-5 for joint 5 |
| 18-20 | Words 3-5 for joint 6 |

If the command word=7 (e.g., a non-cycle or "short" tick) the TMS input buffer assumes the following form:

| Word | Contents |
|---|---|
| 0 | Time stamp |
| 1 | Servo enable mask |
| 2 | Absolute resolver measurement for joint 1 |
| 3 | Absolute resolver measurement for joint 2 |
| 4 | Absolute resolver measurement for joint 3 |
| 5 | Absolute resolver measurement for joint 4 |
| 6 | Absolute resolver measurement for joint 5 |
| 7 | Absolute resolver measurement for joint 6 |

If the command word=6 (e.g., a calibration command) the TMS input buffer is:

| Word | Contents |
|---|---|
| 0 | Time stamp |
| 1 | Absolute position in encoder bits (3208) for joint 1 |
| 2 | Absolute position in encoder bits (3208) for joint 2 |
| 3 | Absolute position in encoder bits (3208) for joint 3 |
| 4 | Absolute position in encoder bits (3208) for joint 4 |
| 5 | Absolute position in encoder bits (3208) for joint 5 |
| 6 | Absolute position in encoder bits (3208) for joint 6 |

If the command word=A (e.g., ID command), no inputs are required in the TMS input buffer.

The purpose of the TMS status buffer is to provide an area where any process can look to find out the current position/velocity of the arm. As such this buffer is ordered as follows:

| Word | Contents |
|---|---|
| 0 | Time stamp (future) |
| 1 | Enable/disable bit mask |
| 2 | Limp status bit mask |
| 3 | Brake status bit mask |
| 4 | PFB, Position of joint 1 in encoder bits in 3208 form (high word) |
| 5 | PFB, Position of joint 1 in encoder bits (low word) |
| 6 | VFINO, Velocity of joint 1 in encoder bits/servo-tick in 1608 form |
| 7-9 | 4-6 for joint 2 |
| 10-12 | 4-6 for joint 3 |
| 13-15 | 4-6 for joint 4 |
| 16-18 | 4-6 for joint 5 |
| 19-21 | 4-6 for joint 6 |
| 22 | Status (error/no error/command error) |
| 23 | Servo coincidence word (fine/course) |
| 24-25 | Error status (hi and low) |
| 26 | Input task bit mask (hi byte)/completion status bit mask (low byte) |

The torque output buffer contains the torques to be applied over the next servo tick. The torques are formatted such that the 68k can simply copy them directly to the appropriate device (DAC/TP board) without modification. This buffer is simply organized as:

| Word | Contents |
|---|---|
| 0 | Torque output for joint 1 |
| 1 | Torque output for joint 2 |
| 2 | Torque output for joint 3 |
| 3 | Torque output for joint 4 |
| 4 | Torque output for joint 5 |
| 5 | Torque output for joint 6 |

The logged data buffer currently is composed of the following items all recorded at the servo sample rate:

| Word | Contents |
|---|---|
| 0 | Joint 1 PCT, Position command in 3208 form (high word) |
| 1 | Joint 1 PCT, Position command (low word) (bits) |
| 2 | Joint 1 VCT, Velocity command in 1608 form (B/tick) |
| 3 | Joint 1 VFBF, Filtered velocity feedback in 1608 form (B/tick) |
| 4 | Joint 1 Position error in 1605 form (bits) |
| 5 | Joint 1 Integration error in 32016 form (high word) |
| 6 | Joint 1 Integration error (low word) |
| 7 | Joint 1 Velocity error in 1608 form (B/tick) |
| 8 | Joint 1 DVHATC Accel command in 1608 (B/tick/tick) |
| 9 | Joint 1 SUM, Intermediate signal sum in 1600 form |
| 10-18 | 0-8 for joint 2 |
| 19-27 | 0-8 for joint 3 |
| 28-36 | 0-8 for joint 4 |
| 37-45 | 0-8 for joint 5 |
| 46-54 | 0-8 for joint 6 |

The General Communication area is used as a general read/write area for passing information to and from the servo calculator.

Next, block 488 of FIG. 11A determines whether the torque processor board 600 of FIG. 4 is ready for data transfer and if not an error shutdown is commanded. Normally, however, the TP board 600 would be ready and block 489 transfers torque command and/or other data to the TP board 600. Other data may include servo gains and correct gains for the particular robot being controlled, all of which would be downloaded during step-up time. Blocks 490 and 491 then perform synchronous and one-shot data logging routines. The one-shot data logger 491 is flagged for operation by various routines when an error occurs.

SCM Data Logger Mechanisms

Both data loggers 490 and 491 shown in FIGS. 11G and 11H, respectively, are controlled by a shared RAM "mailbox" interface. In addition, both are invoked in the servo interrupt routine immediately following the execution of the servo code. Therefore, the fastest rate at which data can be logged is dictated by the servo update rate employed (currently this is 1 ms). In the case of the one-shot data logger, it can also be invoked via a subroutine call (JSR logone). This is provided so that conditions present during unexpected errors can be recorded immediately (for example, prior to an emergency shutdown).

The shared RAM interface for the synchronous data logger is organized as follows (where all addresses are specified as offsets from a base address):

| Offset | Size | Contents |
| --- | --- | --- |
| 0 | 8 bits | Semaphore (1 = > log data) |
| 1-3 | 24 bits | Not used |
| 4-5 | 16 bits | Starting tick counter |
| 6-7 | 16 bits | Not used |
| 8-9 | 16 bits | Ending tick counter |
| a-b | 16 bits | Not used |
| c-f | 32 bits | Pointer to list of addresses to log (32 bit data transfers) |
| 10-13 | 32 bits | Pointer to area in memory for SCM to deposit logged data |

Note:
The areas which are not used in the above map will be eliminated in the future. They exist only because the original interface exclusively used long word quantities.

The shared RAM interface for the asynchronous one-shot data logger is organized as follows (where all addresses are specified as offsets from a base address):

| Offset | Size | Contents |
| --- | --- | --- |
| 0 | 8 bits | One-shot trigger (1 = log, reset to 0) |
| 1 | 8 bits | Not used |
| 2-3 | 16 bits | Total event counter |

In the servo calculator, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithm executed by the servo calculator is shown in greater detail in FIG. 3.

For more detail on the SCM board circuitry, reference is made to Ser. No. 932,990.

What is claimed is:
1. A robot comprising:
an arm having a plurality of joints;
each of said joints having an electric motor drive;
a power amplifier operable to supply drive current to each motor;
respective feedback control loop means for respectively controlling said power amplifier for each of said joint motors;
each of said feedback control loop means including digital position and velocity control loops being adaptable to control the associated drive current from the power amplifier to the respective joint motor;
first servo control means for performing control support tasks and calculation tasks for at least one of said control loops for each of the joint motors;
said first servo control means including a first microprocessor for performing calculation tasks including computing output torque control commands from stored algorithms for said one control loop for each joint motor;
said first microprocessor having a relatively high computing performance capability and a relatively low data processing interface capability;
said first servo control means further including a second microprocessor for supervising the operation of said first servo control means and performing interactive servo control support tasks in said one control loop for each joint motor including the routing of control command, status and feedback data to and from said first microprocessor;
said second microprocessor having a relatively high data processing performance capability; and
means for concurrently reading and writing through interlocking cyclic handshaking of shared memory channels by said first and second microprocessors relative to each other and relative to higher and lower level control circuitry, without impacting the control processing performance of either microprocessor, so as to enable said first servo control means to operate said one control loop for each joint motor and control the respective variable output torque commands for said control loops.
2. A robot as set forth in claim 1 wherein said first servo control means performs tasks for both said position and said velocity control loops with said first microprocessor including first and second coprocessors for performing calculation tasks for both loops and with each acting as coprocessor for said second microprocessor which performs control support tasks for both loops, said first coprocessor providing high speed fixed point calculation capability for position velocity calculations and said second coprocessor providing floating point calculation capability for arm movement solutions provided by said first servo control means.
3. A robot comprising:
an arm having a plurality of joints;
each of said joints having an electric motor drive;
a power amplifier operable to supply drive current to each motor;
respective feedback control loop means for respectively controlling said power amplifier for said joint motors;
each of said feedback control loop means including digital position and velocity control loops being adapted to control the associated power amplifier drive current;
first servo control means for performing control support tasks and calculation tasks for at least one of said control loops for each of the joint motors;

said first servo control means including a first microprocessor for performing calculation tasks including computing output control commands from stored algorithms for said one control loop for each joint motor;

said first microprocessor having a relatively high computing performance capability and a relatively low data processing interface capability;

said first servo control means further including a second microprocessor for supervising the operation of said first servo control means and performing servo control support tasks in said one control loop for each joint motor including the routing of control command, status and feedback data to and from said first microprocessor;

said second microprocessor having a relatively high data processing performance capability;

means for interfacing said first and second microprocessors relative to each other and relative to higher and lower level control circuitry so as to enable said first servo control means to operate said one control loop for each joint motor and control the controlled output variable for said one control loop;

said feedback control loop means for each joint motor further includes a torque control loop with a forward path output from said position and velocity control loops providing a motor current setpoint for torque control;

second servo control means are provided for performing control support tasks and calculation tasks for said torque control loop for each joint motor;

said second servo control means including a third microprocessor for performing calculation tasks including computing output control commands from stored algorithms for said torque control loop for each joint motor;

said third microprocessor having a relatively high computing performance capability and a relatively low data processing interface capability;

said second servo control means further including a fourth microprocessor for supervising the operation of said second servo control means and performing servo control support tasks in said torque control loop for each joint motor including the routing of control command, status and feedback data to and from said third microprocessor; and means for interfacing said third and fourth microprocessors relative to each other and relative to higher and lower level control circuitry so as to enable said second servo control means to operate said torque control loop and control the torque for each joint motor.

4. A robot as set forth in claim 3 wherein said first servo control means performs tasks for both said position and said velocity control loops with said first microprocessor performing calculation tasks for both loops and said second microprocessor performing control support tasks for both loops.

5. A robot as set forth in claim 1 wherein:
said feedback control loop means for each joint motor further includes a torque control loop with a forward path output from said position and velocity control loops providing a motor current setpoint for torque control; and said first servo control means performs control support tasks and calculation tasks for at least one of said position and velocity and torque control loops.

6. A robot as set forth in claim 5 wherein said robot has at least six motor operated joints.

7. A robot as set forth in claim 1 wherein:
said feedback control loop means for each joint motor further includes a torque control loop with a forward path output from said position and velocity control loops providing a motor current setpoint for torque control;

second servo control means are provided for performing control support tasks and calculation tasks for said torque control loop for each joint motor;

said second servo control means including a third microprocessor for performing calculation tasks including computing output control commands from stored algorithms for said torque control loop for each joint motor;

said third microprocessor having a relatively high computing performance capability and a relatively low data processing interface capability;

said second servo control means further including a fourth microprocessor for supervising the operation of said second servo control means and performing servo control support tasks in said torque control loop for each joint motor including the routing of control command, status and feedback data to and from said third microprocessor; and means for concurrently reading and writing through interlocking shared memory channels by interfacing said third and fourth microprocessors relative to each other and relative to higher and lower level control circuitry so as to enable said second servo control means to operate said torque control loop and control the torque for each joint motor.

8. A digital control for a robot having a plurality of arm joints each driven by an electric motor, said control comprising:

a power amplifier operable to supply drive current to each motor;

respective feedback control loop means for respectively controlling said power amplifier for each of said joint motors;

each of said feedback control loop means including digital position and velocity control loops being adaptable to control the associated power amplifier drive current;

first servo control means for performing control support tasks and calculation tasks for at least one of said control loops for each of the joint motors;

said first servo control means including a first microprocessor for performing calculation tasks including computing output control commands from stored algorithms for said one control loop for each joint motor;

said first microprocessor having a relatively high computing performance capability and a relatively low data processing interface capability;

said first servo control means further including a second microprocessor for supervising the operation of said first servo control means and performing interactive servo control support tasks in said one control loop for each joint motor including the routing of control command, status and feedback data to and from said first microprocessor; and means for concurrently reading and writing through interlocking shared memory channels by interfacing said first and second microprocessors relative to each other and relative to higher and lower level control circuitry so as to enable said first servo control means to operate said one control loop for each joint motor and control the respective output control commands for said one control loop.

9. A digital control for a robot as set forth in claim 8 wherein said first servo control means performs tasks for both said position and said velocity control loops with said first microprocessor including first and second coprocessors for performing calculation tasks for both loops and with each acting as coprocessor for said second microprocessor performing control support tasks for both loops, said first coprocessor providing high speed fixed point calculations for position velocity solutions and said second coprocessor providing floating point solutions for arm movement of said first servo control means.

10. A digital control for a robot having a plurality of arm joints each driven by an electric motor, said control comprising:
   a power amplifier operable to supply drive current to each motor;
   respective feedback control loop means for respectively controlling said power amplifier for each of said joint motors;
   each of said feedback control loop means including digital position and velocity control loops being adaptable to control the associated power amplifier drive current;
   first servo control means for performing control support tasks and calculation tasks for one of said control loops for each of the joint motors;
   said first servo control means including a first microprocessor for performing calculation tasks including computing output control commands from stored algorithms for said one control loop for each joint motor;
   said first microprocessor having a relatively high computing performance capability and a relatively low data processing interface capability;
   said first servo control means further including a second microprocessor for supervising the operation of said first servo control means and performing servo control support tasks in said one control loop for each joint motor including the routing of control command, status and feedback data to and from said first microprocessor;
   means for interfacing said first and second microprocessors relative to each other and relative to higher and lower level control circuitry so as to enable said first servo control means to operate said one control loop for each joint motor and control the controlled output variable for said one control loop;
   said feedback control loop means for each joint motor further includes a torque control loop with a forward path output from said position and velocity control loops providing a motor current setpoint for torque control;
   second servo control means are provided for performing control support tasks and calculation tasks for said torque control loop for each joint motor;
   said second servo control means including a third microprocessor for performing calculation tasks including computer output control commands from stored algorithms for said torque control loop for each joint motor;
   said third microprocessor having a relatively high computing performance capability and a relatively low data processing interface capability;
   said second servo control means further including a fourth microprocessor for supervising the operation of said second servo control means and performing servo control support tasks in said torque control loop for each joint motor including the routing of control command, status and feedback data to and from said third microprocessor; and
   means for interfacing said third and fourth microprocessors relative to each other and relative to higher and lower level control circuitry so as to enable said second servo control means to operate said torque control loop and control the torque for each joint motor.

11. A digital control for a robot as set forth in claim 10 wherein said first servo control means performs tasks for both said position and said velocity control loops with said first microprocessor performing calculation tasks for both loops and said second microprocessor performing control support tasks for both loops.

12. A digital control for a robot as set forth in claim 8 wherein:
   said feedback control loop means for each joint motor further includes a torque control loop with a forward path output from said position and velocity control loops providing a motor current setpoint for torque control; and
   said first servo control means performs control support tasks and calculation tasks for at least one of said position and velocity and torque control loops.

13. A robot control as set forth in claim 9 wherein the robot has at least six motor operated joints.

14. A robot control as set forth in claim 9 wherein:
   said feedback control loop means for each joint motor further includes a torque control loop with a forward path output from said position and velocity control loops providing a motor current setpoint for torque control;
   second servo control means are provided for performing control support tasks and calculation tasks for said torque control loop for each joint motor;
   said second servo control means including a third microprocessor for performing calculation tasks including computing output control commands from stored algorithms for said torque control loop for each joint motor;
   said third microprocessor having a relatively high computing performance capability and a relatively low data processing interface capability;
   said second servo control means further including a fourth microprocessor for supervising the operation of said second servo control means and performing servo control support tasks in said torque control loop for each joint motor including the routing of control command, status and feedback data to and from said third microprocessor; and
   means for interfacing said third and fourth microprocessors relative to each other and relative to higher and lower level control circuitry so as to enable said second servo control means to operate said torque control loop and control the torque for each joint motor.

15. A robot control as set forth in claim 14 wherein the robot has at least six motor operated joints.

16. A digital servo control for a robot control system that employs respective feedback control loop means to control the energization of respective arm joint motors, with each of the feedback control loop means including at least digital position and velocity control loops; said servo control comprising:
- a first microprocessor for performing calculation tasks including computing output control commands from stored algorithms for at least one of said control loops for all of the joint motors;
- said first microprocessor having a relatively high computing performance capability and a relatively low data processing interface capability;
- a second microprocessor for supervising the operation of said servo control means and performing servo control support tasks in said one control loop for each joint motor including the routing of control command, status and feedback data to and from said first microprocessor; and
- means for concurrently interfacing said first and second microprocessors relative to each other and relative to higher and lower level control circuitry so as to enable said servo control means to operate said one control loop for each joint motor and control the controlled variable for said one control loop.

17. A servo control as set forth in claim 16 wherein said servo control means performs tasks for both said position and said velocity control loops with said first microprocessor performing calculation tasks for both loops and said second microprocessor performing control support tasks for both loops.

18. A servo control as set forth in claim 16 wherein the feedback control loop means for each joint motor further includes a torque control loop with a forward path output from said position and velocity control loops providing a motor current setpoint for torque control and wherein said servo control performs control support tasks and calculation tasks for at least one of said position and velocity and torque control loops.

19. A servo control as set forth in claim 18 wherein said servo control performs tasks for the torque control loop.

* * * * *